US012614785B2

(12) United States Patent
Parikh et al.

(10) Patent No.: US 12,614,785 B2
(45) Date of Patent: Apr. 28, 2026

(54) ENERGY STORAGE SYSTEM WITH REMOVABLE, ADJUSTABLE, AND LIGHTWEIGHT PLENUMS

(71) Applicant: Fluence Energy, LLC, Arlington, VA (US)

(72) Inventors: Dishant Saurin Parikh, Clarksville, MD (US); Vishakh Brahmanand Dwivedi, Falls Church, VA (US); Wells Case Jacobson, Jr., Arlington, VA (US); Brett Galura, Arlington, VA (US); Pranit Parekh, Arlington, VA (US); Martin Fuchs, Arlington, VA (US)

(73) Assignee: FLUENCE ENERGY, LLC, Arlington, VA (US)

( * ) Notice: Subject to any disclaimer, the term of this patent is extended or adjusted under 35 U.S.C. 154(b) by 717 days.

(21) Appl. No.: 17/915,906

(22) PCT Filed: May 4, 2021

(86) PCT No.: PCT/US2021/030551
§ 371 (c)(1),
(2) Date: Sep. 29, 2022

(87) PCT Pub. No.: WO2021/226011
PCT Pub. Date: Nov. 11, 2021

(65) Prior Publication Data
US 2023/0155211 A1 May 18, 2023

Related U.S. Application Data

(60) Provisional application No. 63/019,622, filed on May 4, 2020.

(51) Int. Cl.
| | |
|---|---|
| *H01M 10/663* | (2014.01) |
| *H01M 10/613* | (2014.01) |
| *H01M 10/6564* | (2014.01) |
| *H01M 50/209* | (2021.01) |

(52) U.S. Cl.
CPC ....... *H01M 10/663* (2015.04); *H01M 10/613* (2015.04); *H01M 10/6564* (2015.04); *H01M 50/209* (2021.01)

(58) Field of Classification Search
CPC ........... H01M 10/613; H01M 10/6563; H01M 10/6564; H01M 10/663; H01M 2220/10;
(Continued)

(56) References Cited

U.S. PATENT DOCUMENTS

| | | |
|---|---|---|
| 2007/0002536 A1 | 1/2007 | Hall et al. |
| 2010/0059270 A1 | 3/2010 | Yeh et al. |
(Continued)

FOREIGN PATENT DOCUMENTS

| | | |
|---|---|---|
| WO | 2017044830 A1 | 3/2017 |
| WO | 2018128783 A1 | 7/2018 |
| WO | 2018222858 A1 | 12/2018 |

OTHER PUBLICATIONS

Notice of Allowance for U.S. Appl. No. 17/810,983, dated Jun. 22, 2023, 9 pages.
(Continued)

*Primary Examiner* — Victoria H Lynch
(74) *Attorney, Agent, or Firm* — BUCHANAN INGERSOLL & ROONEY PC

(57) ABSTRACT

An example energy storage system includes an enclosure. The enclosure includes at least one door. The enclosure stores a plurality of battery racks. Each battery rack holds a respective plurality of battery modules. The enclosure further stores a plurality of plenums. The plurality of plenums includes a left plenum and a right plenum coupled together to form an enclosed channel around the plurality of battery racks to direct air to the plurality of battery racks. The enclosure further stores a plurality of heating, ventilation, and air conditioning (HVAC) systems mounted on the at
(Continued)

least one door to supply air to the left plenum and the right plenum. Each HVAC system includes a respective supply vent and a respective return vent. The left plenum and the right plenum each include a plenum interface for coupling to the respective supply vent or the respective return vent.

23 Claims, 20 Drawing Sheets

(58) Field of Classification Search
CPC ............ H01M 50/204; H01M 50/209; H01M 50/251; Y02E 60/10
See application file for complete search history.

(56) References Cited

U.S. PATENT DOCUMENTS

| | | | |
|---|---|---|---|
| 2012/0086399 A1 | | 4/2012 | Choi |
| 2014/0210419 A1 | | 7/2014 | Kim |
| 2015/0003009 A1 | | 1/2015 | Moore et al. |
| 2015/0194707 A1 | | 7/2015 | Park |
| 2015/0372517 A1 | | 12/2015 | Lee |
| 2017/0077467 A1* | | 3/2017 | Kronke ............... H01M 10/647 |
| 2017/0294633 A1 | | 10/2017 | Zimbru, Jr. et al. |
| 2018/0142935 A1 | | 5/2018 | Jacobi |
| 2020/0079241 A1* | | 3/2020 | Haeusler ................. B60L 58/26 |
| 2020/0144845 A1 | | 5/2020 | Facchini et al. |
| 2021/0281081 A1 | | 9/2021 | Singer et al. |

OTHER PUBLICATIONS

International Search Report and Written Opinion for International Application No. PCT/US22/44366, mailed Jan. 6, 2023, 13 pages.
The Extended European Search Report issued Jul. 5, 2024, by the European Patent Office in corresponding European Patent Application No. 21800505.6-1218. (6 pages).
International Search Report and Written Opinion for International Application No. PCT/US21/30551, dated Aug. 13, 2021, 14 pages.

* cited by examiner

Plenum (e.g., configured
as Right Plenum 111B)
111x

Plenum Side Plate
407

Plenum Interface
112x

Outer Side Wall
415

Supply Air Channel
519x

HVAC-
Facing Surface
180x

Fixing Mechanism 697x (e.g., Self-Cinching Nut)

Flange 696x

Flange Assembly 695x

Flange 696x

INSTALL S-M6-0ZI FROM FAR SIDE

Ø.344 +.003 -.000

CL

.625

Flange 696x

CL

R.125 TYP

3X Ø.133

6.250

15.250

.240

1.300

.800

.050 (THK)

Deflector Plate 640x

Right Rivet 881x

Left Rivet 806x

Right Deflector Side 810

Left Deflector Side 805

Deflector Plate 640x

Rivet 806x, 811x 0.73

1.59

3.19

1.30

17.71

R 0.13

Ø 0.13

A

DETAIL A
SCALE 2:1

ENERGY STORAGE SYSTEM WITH REMOVABLE, ADJUSTABLE, AND LIGHTWEIGHT PLENUMS

CROSS-REFERENCE TO RELATED APPLICATION

This application is a U.S. National Phase Application of International Application No. PCT/US2021/030551, filed on May 4, 2021, the entirety of which is incorporated by reference herein. International Application No. PCT/US2021/030551 claims priority to U.S. Provisional Patent Application No. 63/019,622, filed on May 4, 2020, titled "Energy Storage System with Removable, Adjustable, and Lightweight Plenums," the entirety of which is incorporated by reference herein.

TECHNICAL FIELD

The present subject matter relates to examples of removable, adjustable, and lightweight plenums for energy storage systems that include battery racks. The present subject matter also encompasses energy storage systems and techniques for coupling plenums to the battery racks.

BACKGROUND

An energy storage system typically includes an enclosure that houses many battery racks inside. The battery racks hold battery modules. To keep the battery racks from overheating, the enclosure typically includes a heating, ventilation, and air conditioning (HVAC) system, such as a cooling system. The enclosure may optionally include alternating current (AC) to direct current (DC) power inverters, and DC-DC power converters inside.

The HVAC system typically includes plenums to distribute air. A supply plenum is an air-distribution box that attaches to a supply outlet of the HVAC equipment to distribute cool air in air conditioning mode. A return plenum is an air-collection box that attaches to the HVAC equipment to draw back warm air into the HVAC equipment in air conditioning mode. Supply ductwork connects to the supply plenum for distribution of the cool air and return ductwork connects to the return plenum for collection of the warm air, which creates inefficient airflow.

Existing plenums are enclosed from all sides and include rectangular or circular openings. For energy storage systems, the existing plenums are problematic in terms of operating requirements, installation time, and construction costs. First, existing plenum designs require that the cross-sectional area of the plenum meet or exceed the cross-sectional area of the HVAC supply/return in order to maintain the speed of airflow in the enclosure environment. Second, the existing plenums that exist in the market require bolts, screws, or brackets to secure them in place. Third, the existing plenums require insulation, which takes up more space and weight. Fourth, the construction costs of affixing existing plenums to the HVAC system is high.

SUMMARY

Hence, there is room for further improvement in plenums and energy storage systems that incorporate such plenums. The plenum technologies disclosed herein have a very lean and lightweight design, as well as reduce installation time and costs. With the plenum technologies, the battery rack structure along with the batteries housed in the battery racks becomes part of the airflow pathway. Compared to existing plenums in the market, the disclosed plenum technologies allow for easier maintenance, are more efficient, and have a decreased cost of renovation and reconfiguration if needed.

In a first example, an energy storage system includes an enclosure. The enclosure includes at least one door. The enclosure stores a plurality of battery racks. Each battery rack holds a respective plurality of battery modules. The enclosure further stores a plurality of plenums. The plurality of plenums includes a left plenum and a right plenum coupled together to form an enclosed channel around the plurality of battery racks to direct air to the plurality of battery racks. The enclosure further stores a plurality of heating, ventilation, and air conditioning (HVAC) systems mounted on the at least one door to supply air to the left plenum and the right plenum. Each HVAC system includes a respective supply vent and a respective return vent. The left plenum and the right plenum each include a plenum interface for coupling to the respective supply vent or the respective return vent.

In a second example, an energy storage system includes a plurality of battery racks and a plurality of plenums. The plurality of plenums are coupled together to form an enclosed channel around the plurality of battery racks to direct air to the plurality of battery racks.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements. A reference numeral including the letter "x" (e.g., 111x) is intended to refer to all elements (parts) having the same beginning part of the reference numeral (e.g., 111).

DETAILED DESCRIPTION

Figure 1A:
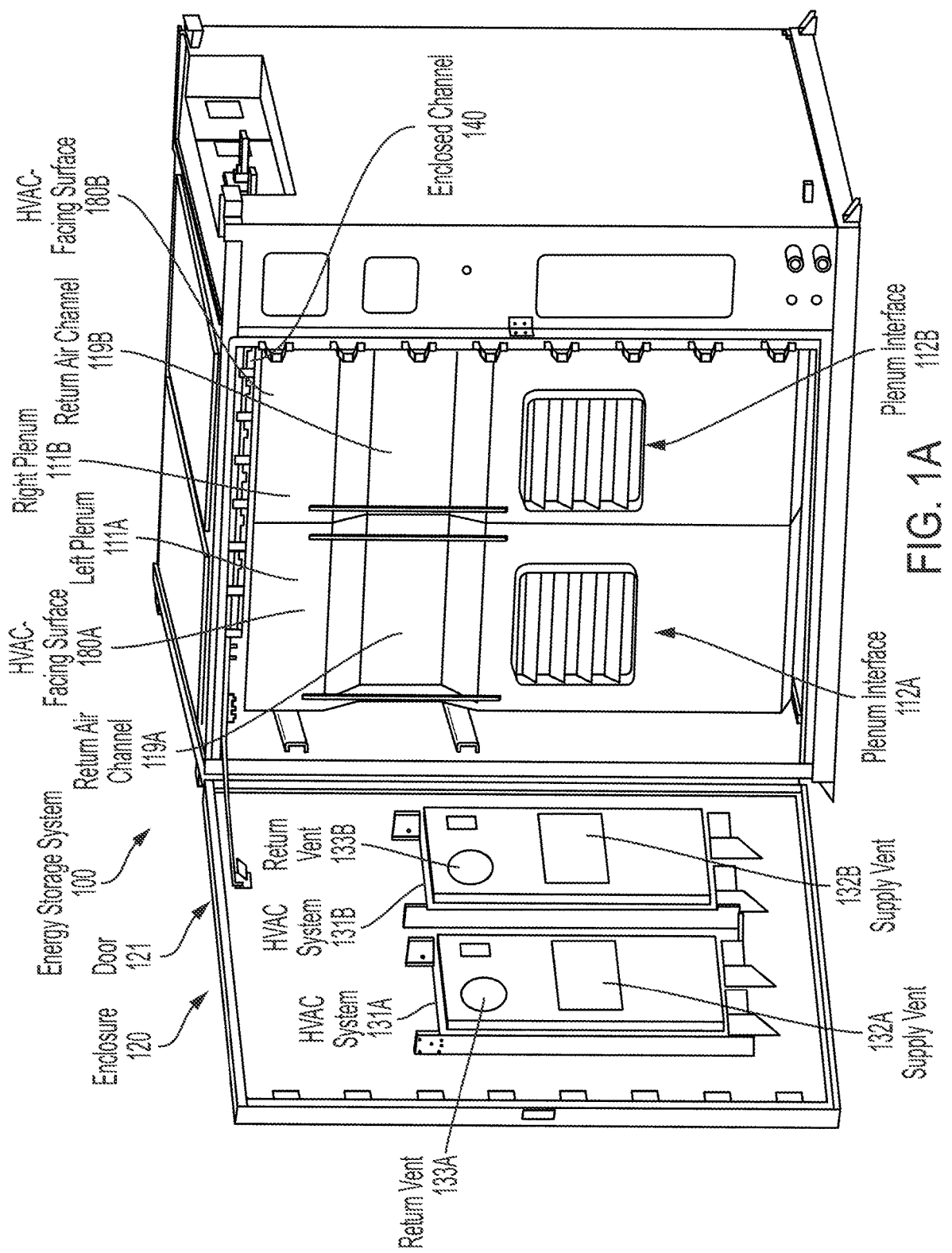
FIG. 1A is an isometric view of an energy storage system that includes an enclosure having at least one door.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical, physical, electrical, or optical connection, link or the like by which signals or light produced or supplied by one system element are imparted to another coupled element. Unless described otherwise, coupled elements or devices are not necessarily directly connected to one another and may be separated by intermediate components, elements, or communication media that may modify, manipulate or carry the light or signals.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount. The terms "approximately" and "substantially" mean that the parameter value or the like varies up to ±10% from the stated amount.

The orientations of the plenums, associated components, and/or any complete devices, such as energy storage systems, incorporating plenums such as shown in any of the drawings, are given by way of example only, for illustration and discussion purposes. In operation for a particular energy storage application, a plenum may be oriented in any other direction suitable to the particular application of the energy storage system, for example upright, sideways, or any other orientation. Also, to the extent used herein, any directional term, such as left, right, front, rear, back, end, up, down, upper, lower, top, bottom, and side, are used by way of example only, and are not limiting as to direction or orientation of any energy storage system or plenum; or component of an energy storage system or plenum constructed as otherwise described herein. Reference now is made in detail to the examples illustrated in the accompanying drawings and discussed below.

FIG. 1A is an isometric view of an energy storage system 100 that includes an enclosure 120. As shown, enclosure 120 includes at least one door 121. The enclosure 120 stores a plurality of battery racks 101A-C. Each battery rack 101A-C holds a respective plurality of battery modules 102A-N, 103A-N, 104A-N. Each respective plurality of battery modules 102A-N, 103A-N, 104A-N is shown as a separate stack of battery modules 102x.

Figure 1B:
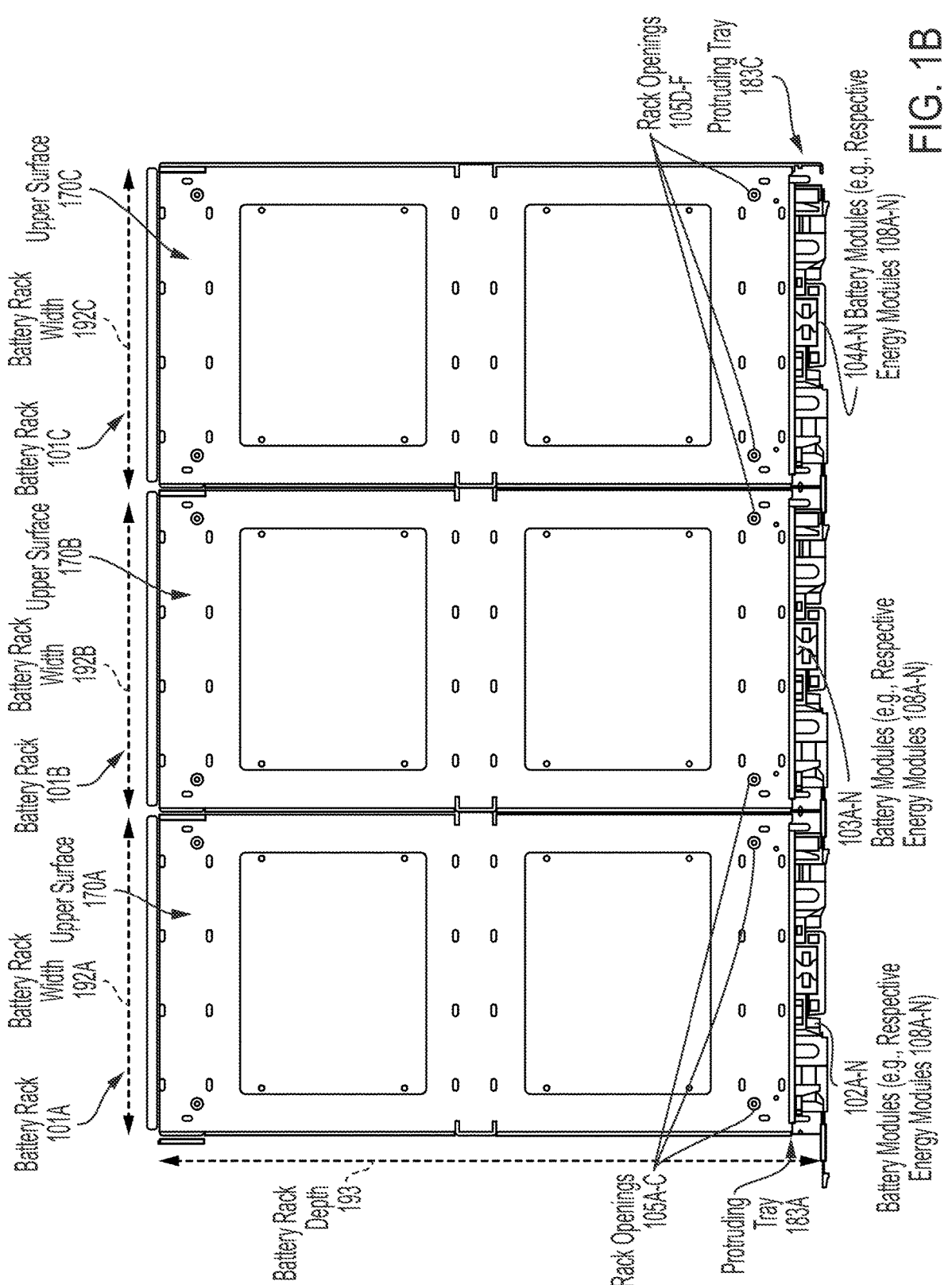
FIG. 1B is a top view of the plurality of battery racks stored in the enclosure.
Figure 1C:
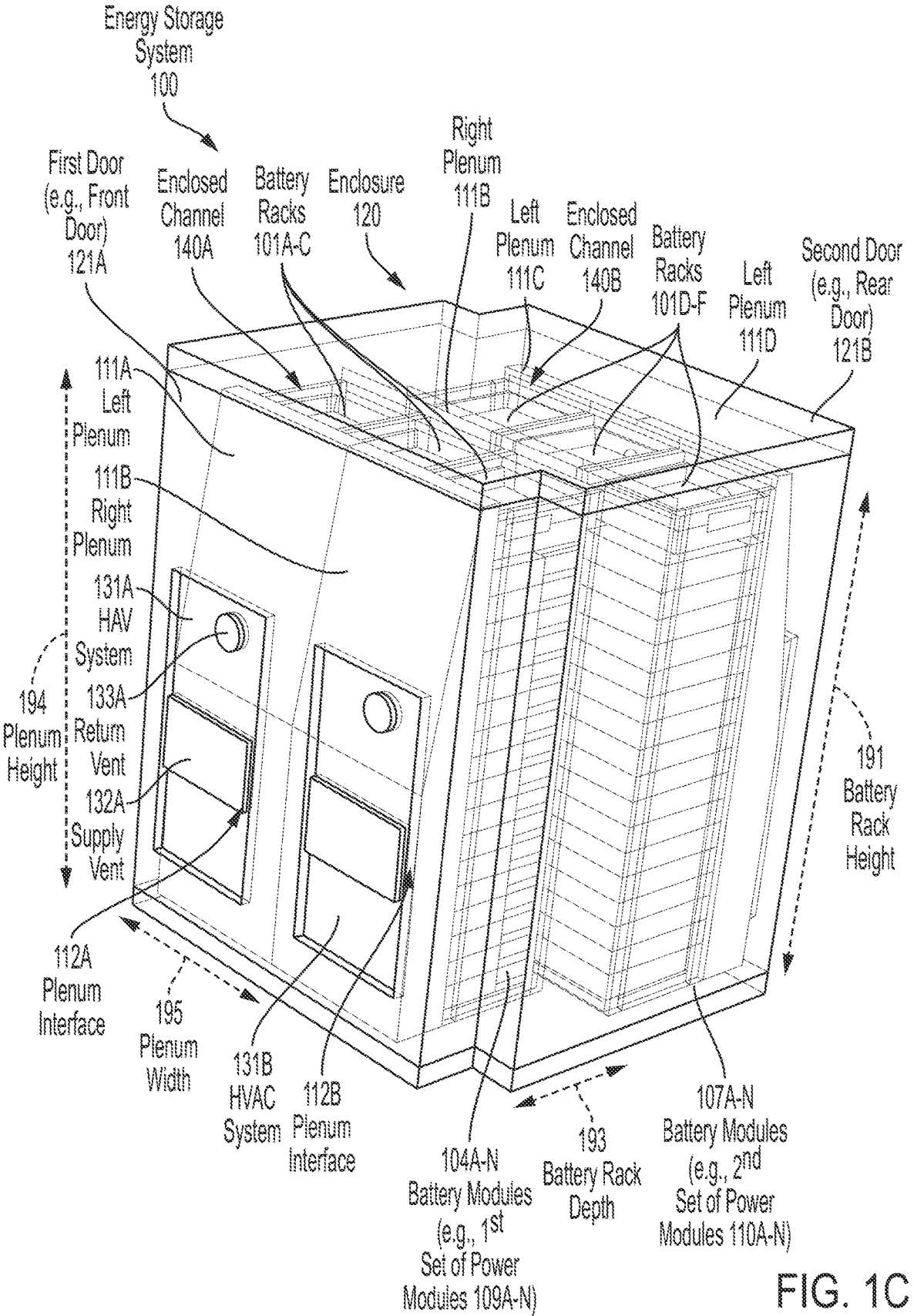
FIG. 1C is an isometric view of the energy storage system that includes an enclosure that includes a plurality of doors.

FIGS. 1A-B show an example in which energy storage system 100 includes three battery racks 101A-C and thus the respective plurality of battery modules 102A-N, 103A-N, 104A-N are depicted as three separate stacks of battery modules 102A-N, 103A-N, 104A-N held in a respective battery rack 101A-C. In comparison, FIG. 1C shows an example in which energy storage system 100 includes six battery racks 101A-F. Thus, the respective plurality of battery modules 102A-N, 103A-N, 104A-N, 105A-N, 106A-N, 107A-N are depicted as six separate stacks of battery modules 102A-N, 103A-N, 107A-N held in a respective battery rack 101A-F. Each plurality of battery modules 102x, 103x, . . . 107x can include fewer or greater than fourteen battery modules, for example, five, fifteen, etc. For example, seventeen (17) battery modules 104A-Q, 107A-Q are actually shown in FIG. 1C.

Each battery module 102A-N, 103A-N, 107A-N, . . . 107A-N includes, for example, an array of prismatic, pouch, or cylindrical battery cells that are packaged together to increase voltage, amperage, or both. In some examples, each battery module 102A-N, 103A-N, . . . 107A-N may include an electric vehicle battery pack, e.g., a collection of lithium-ion battery cells that are packaged together.

The enclosure further stores a plurality of plenums 111A-B. Two plenums 111A-B are shown in FIG. 1A. The plurality of plenums 111x can include fewer or greater than two plenums 111A-B, for example, one, three, four, or five plenums 111x. Four plenums 111A-D are shown in FIG. 1C.

The plurality of plenums 111A-B includes a left plenum 111A and a right plenum 111B coupled together to form an enclosed channel 140 around the plurality of battery racks 101A-C to direct air to the plurality of battery racks 101A-C. Due to the formation of the enclosed channel 140, the plurality of battery racks 101A-C are not visible in FIG. 1A. For example, the left and right plenums 111A-B are designed to be installed inside the enclosure 120, in front of the three battery racks 101A-C.

The enclosure 120 further stores a plurality of heating, ventilation, and air conditioning (HVAC) systems 131A-B. HVAC systems 131A-B are mounted on the at least one door 121 to supply air to the left plenum 111A and the right plenum 111B. HVAC systems 131A-B supply cold or warm air to the plurality of plenums 111A-B for cooling or heating of the battery modules 102A-N held in battery racks 101A-C. Each HVAC system 131A-B includes a respective supply vent 132A-B (e.g., to output cool air to battery modules 102A-N) and a respective return vent 133A-B (e.g., to remove warm air from battery modules 102A-N). The respective supply vent 132A-B and the respective return vent 133A-B may be circular, rectangular, or have another shape to equally distribute the air and equalize the pressure. In the example, the supply vents 132A-B are rectangular shaped and the return vents 133A-B are circular shaped. The left plenum 111A and the right plenum 111B each include a plenum interface 112A-B for coupling to the respective supply vent 132A-B or the respective return vent 133A-B. Although the HVAC systems 131A-B each include a single respective supply vent 132A-B and a single respective return vent 133A-B in FIG. 1A, the number of supply vents 132x and return vents 133x may be greater than shown.

FIG. 1B is a top view of the plurality of battery racks 101A-C stored in the enclosure 120. As shown in FIG. 1B, the enclosure 120 stores the plurality of battery racks 101A-C and many battery modules 102A-N, 103A-N, 104A-N are held in the depicted battery racks 101A-C. Three battery racks 101A-C are shown, but fewer or greater than three battery racks 101A-C, for example, one, two, four, five, etc. battery racks 101x can be stored in the enclosure 120. As further shown in FIG. 1B, each battery rack 101A-C includes a respective upper surface 170A-C. As shown, each battery rack 101A-C has a mounted protruding tray 183A-C and the protruding tray 183A-C is visible at the front of the battery racks 101A-C.

Each respective upper surface 170A-C includes a plurality of rack openings 170x. In the example of FIG. 1B, upper surface 170A includes two rack openings 105A-B, upper surface 170B includes two rack openings 105C-D, and upper surface 170C includes two rack openings 105E-F. For example, the rack openings 170x are holes in the upper surfaces 170A-C to attach plenums 111A-B. Rack openings 170A-B enable left plenum 111A to couple to the battery rack 101A and rack opening 170C enables left plenum 111A to couple to battery rack 101B. Rack openings 170D enables right plenum 111B to couple to the battery rack 101B and rack openings 170E-F enable right plenum 111B to couple to battery rack 101C.

The plurality of battery modules 102A-N, 103A-N . . . 107A-N can include power energy modules 108A-N, power modules 109A-N, or a combination of the energy modules 108A-N and the power modules 109A-N. In FIGS. 1A-B, the battery modules 102A-N, 103A-N, 104A-N include respective energy modules 108A-N, which are capable of long duration charge and discharge (e.g., approximately 2 hours for full charge or discharge). In FIG. 1B, the front of the respective energy modules 108A-N is the labeled area of protruding trays 183A-C that stick out from the battery racks 101A-C for connection to cables that are routed inside the enclosed channel 140.

In FIG. 1C, the battery modules 102A-N, 103A-N, . . . 107A-N include respective power modules 109A-N, which are capable of short duration charge and discharge (approximately 30 minutes or 1 hour for full charge or discharge). Because the respective energy modules 108A-N are larger in size (e.g., approximately double depth 193 of the two sets of power modules 109A-N, 110A-N), the enclosure includes a single door 121 in FIGS. 1A-B. In contrast, the enclosure of FIG. 1C includes two doors 121A-B because the two sets of power modules 109A-N, 110A-N are smaller in size (e.g., approximately half depth 193) of the energy modules 108A-N.

Two HVAC systems 131A-B are shown in FIG. 1A and are mounted on the door 121. The number of HVAC systems 131x can include fewer or greater than two HVAC systems 131A-B, for example, one, three, four, five, etc. Each HVAC system 131A-B can include an air handler (air handling unit) like that shown in FIG. 1A, a compressor (not shown), and a heater (e.g., gas furnace or heat pump). The air handler of each HVAC system 131A-B includes a blower (not shown) and includes an evaporator coil. The compressor includes a condenser coil.

During air conditioning mode, warm return air is drawn in from a respective return air channel 119A-B to a respective return vent 133A-B. Return air channels 119A-B are located outside the enclosed channel 140 formed by the plenums 111A-B. Return air channels 119A-B are shown as the inwards sloped surfaces formed on the HVAC-facing surface 180A-B of the plenums 111A-B. However, return air channels 119A-B can be sloped (e.g., inwards or outwards), curved, flat or a combination thereof. Refrigerant-filled tubing circulates refrigerant between the evaporator coil and the condenser coil to cool the warm return air from the respective return vent 133A-B intake and supply cold air from the respective supply vent 132A-B output. This cold air supply is then directed out of the HVAC system 131A-B to the battery racks 101A-C via the plenum interface 112A-B of the plenums 111A-B.

In a cold climate during wintertime, HVAC systems 131A-B run in a heating mode. During heating mode, cold return air is drawn in from a respective return air channel 119A-B to a respective return vent 133A-B and heated by the heater (e.g., gas furnace or heat pump) to warm the cold return air from the respective return vent 133A-B intake and supply warm air from the respective supply vent 132A-B output. This warm air supply is then directed out of the HVAC system 131A-B to the battery racks 101A-C via the plenum interface 112A-B of the plenums 111A-B.

FIG. 1C is an isometric view of the energy storage system 100 that includes an enclosure 120. As shown, enclosure 120 includes a plurality of doors 121A-B. In FIG. 1C, two HVAC systems 131A-B are mounted on the first door 121A and two HVAC systems 131C-D (not shown) are mounted on the second door 131B. As shown in FIGS. 1B-C, each plenum 111x has a plenum height 194 that approximately covers (e.g., encloses) an entire height 191 of the respective battery rack 101x and at least a width 192x of the respective battery rack 101x. More specifically, each plenum 111x includes: (i) a plenum height 194 that approximately covers one (1) battery rack 101x in battery pack height 191; and (ii) a plenum width 195 that approximately covers one-and-a-half (1.5) battery racks 101x in battery pack width 192A-C.

The plurality of plenums 111A-D include a first plenum set 111A-B and a second plenum set 111C-D. The first plenum set 111A-B includes a first left plenum 111A and a first right plenum 111B. The second plenum set 111C-D includes a second left plenum 111C and a second right plenum 111D. The enclosure 120 includes a first door 121A and a second door 121B. The respective plurality of battery modules 104A-N, 107A-N include a respective set of power modules 109A-N, 110A-N. The plurality of battery racks 101A-F include a first set of battery racks 101A-C facing the first door 121A that hold a respective first set of power modules 109A-N. The plurality of battery racks 101A-F further include a second set of battery racks 101D-F facing the second door 121B that hold a respective second set of power modules 110A-N. The first left plenum 111A and the first right plenum 111B form a first enclosed channel 140A around the first set of battery racks 101A-C to direct air to the first set of battery racks 101A-C. The second left plenum 111C and the second right plenum 111D form a second enclosed channel 140B around the second set of battery racks 101E-F to direct air to the second set of battery racks 101D-F.

In the example of FIG. 1C, the first door 121A is a front door and the second door 121B is a rear door. As shown, two HVAC systems 131A-B are mounted on the first door 131A (e.g., front door). Although not visible, another two HVAC systems 131C-D are mounted on the second door 131B (e.g., rear door). The three front-facing battery racks 101A-C are coupled to the plenum interfaces 112A-B of the first left plenum 111A and the first right plenum 111B. The three rear-facing battery racks 101D-F are coupled to the plenum interfaces 112C-D (not shown) of the second left plenum 111C and the second right plenum 111D.

Figure 1D:
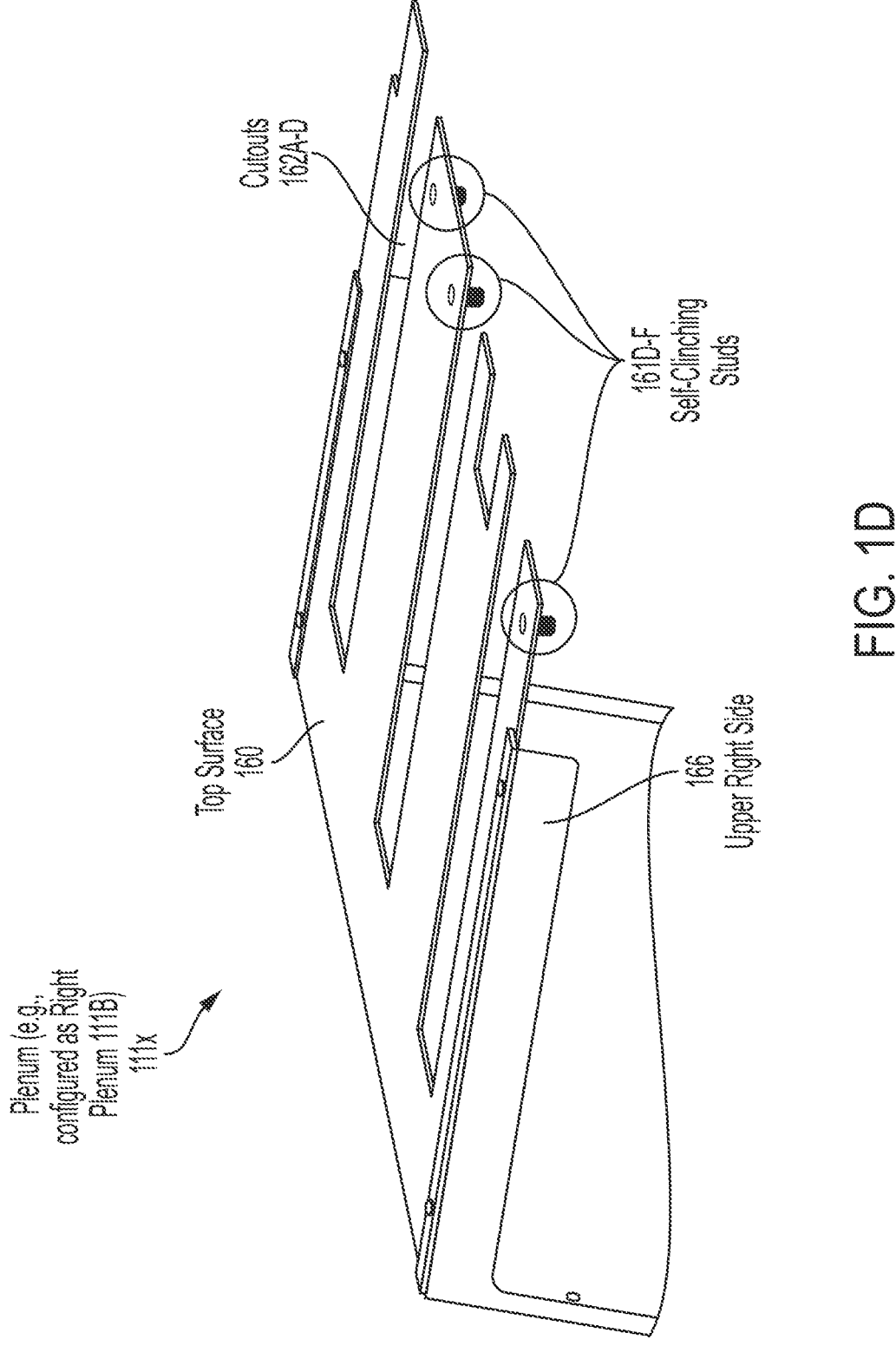
FIG. 1D is a zoomed in perspective view of a plenum, e.g., configured as a right plenum, that shows a top surface of the plenum for coupling to the upper surfaces of battery racks.

FIG. 1D is a zoomed in perspective view of a plenum 111x, e.g., configured as a right plenum 111B, that shows a top surface 160 of the plenum 111B for coupling to the upper surfaces 170A-C of battery racks 101A-C. In one example, the plenum 111x can be made of aluminum 5052-H32 with a thickness of approximately 0.040 inches to keep the plenum 111x lightweight. The plenum 111x can be made of other types of metals, alloys, or other suitable thermally conductive materials. As shown, plenum 111x has cutouts 162A-D on the top surface 160 and upper right side 166. The cutouts 162A-D are added for the cable routing to the battery racks 101A-C. Because the plenum 111x is configured as right plenum 111B, the right plenum 111B encloses half of battery rack 101B and the entirety of battery rack 101C.

As shown, the top surface 160 of plenum 111x includes a plurality of self-clinching studs 161x. For example, the self-clinching studs 161x are separately formed and then connected together with the plenum 111A. For example, self-clinching studs 161x are PEM® studs; however, the self-clinching studs 161x can be formed integrally with the plenum 111x. In the example, right plenum 111B includes three self-clinching studs 161D-F, which are shown in an encircled area. The top surface 160 of the right plenum 111B has self-clinching studs 161D-F for alignment and positioning over the rack openings 105D-F shown in FIG. 1B. Although not shown, the left plenum 111A similarly includes a plurality of self-clinching studs 161A-C for alignment and positioning over the rack openings 105A-C shown in FIG. 1B.

When the left plenum 111A and the right plenum 111B of FIG. 1B are coupled to battery racks 101A-C, self-clinching studs 161A-B of the left plenum 111A are coupled to two of the rack openings 105A-B of the battery rack 101A. Self-clinching stud 161C of the left plenum 111A is coupled to the rack opening 105C of the battery rack 101B. Self-clinching stud 161D of the right plenum 111B is coupled to the other rack opening 105D of the battery rack 101B. Self-clinching studs 161E-F of the right plenum 111B are coupled to the rack openings 105E-F of the battery rack 101C.

Figure 2:
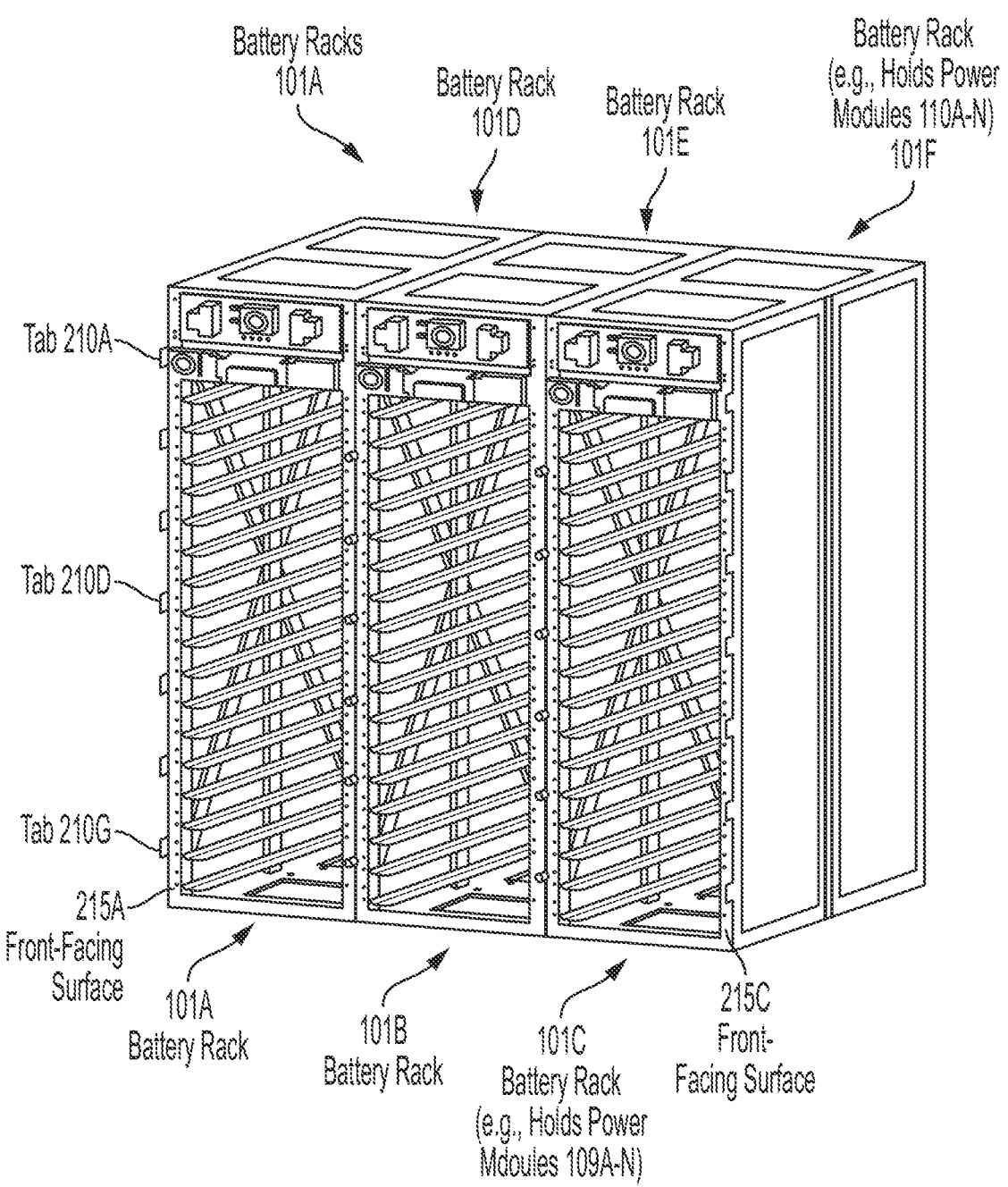
FIG. 2 is an isometric view of the battery racks of FIG. 1C.

FIG. 2 is an isometric view of the battery racks 101A-F of FIG. 1C. Generally, a respective battery rack 101A-F includes a plurality of battery modules 102A-N. Hence, the six battery racks 101A-F are for holding respective battery modules 102A-N, 103A-N, . . . 107A-N. As depicted, the two sets of power modules 109A-N, 110A-N of FIG. 1C are in a back-to-back configuration. In the back-to-back configuration, a front-facing battery rack 101C holds a respective set of front-facing power modules 109A-N and a rear-facing battery rack 101F holds a respective set of rear-facing power modules 110A-N.

As shown, the battery racks 101A-F include a respective front-facing surface 215A-F. The respective front-facing surface 215A-F includes a respective plurality of tabs 210A-G for coupling to the plenums 111A-B. Existing battery rack designs may include tabs, but the tabs are typically for routing cables. But in FIG. 2, each of the battery racks 101A-F have tabs 210A-G on both sides of the front-facing surface 215x to actually support the plenum(s) 111x for installation purposes.

Figure 3A:
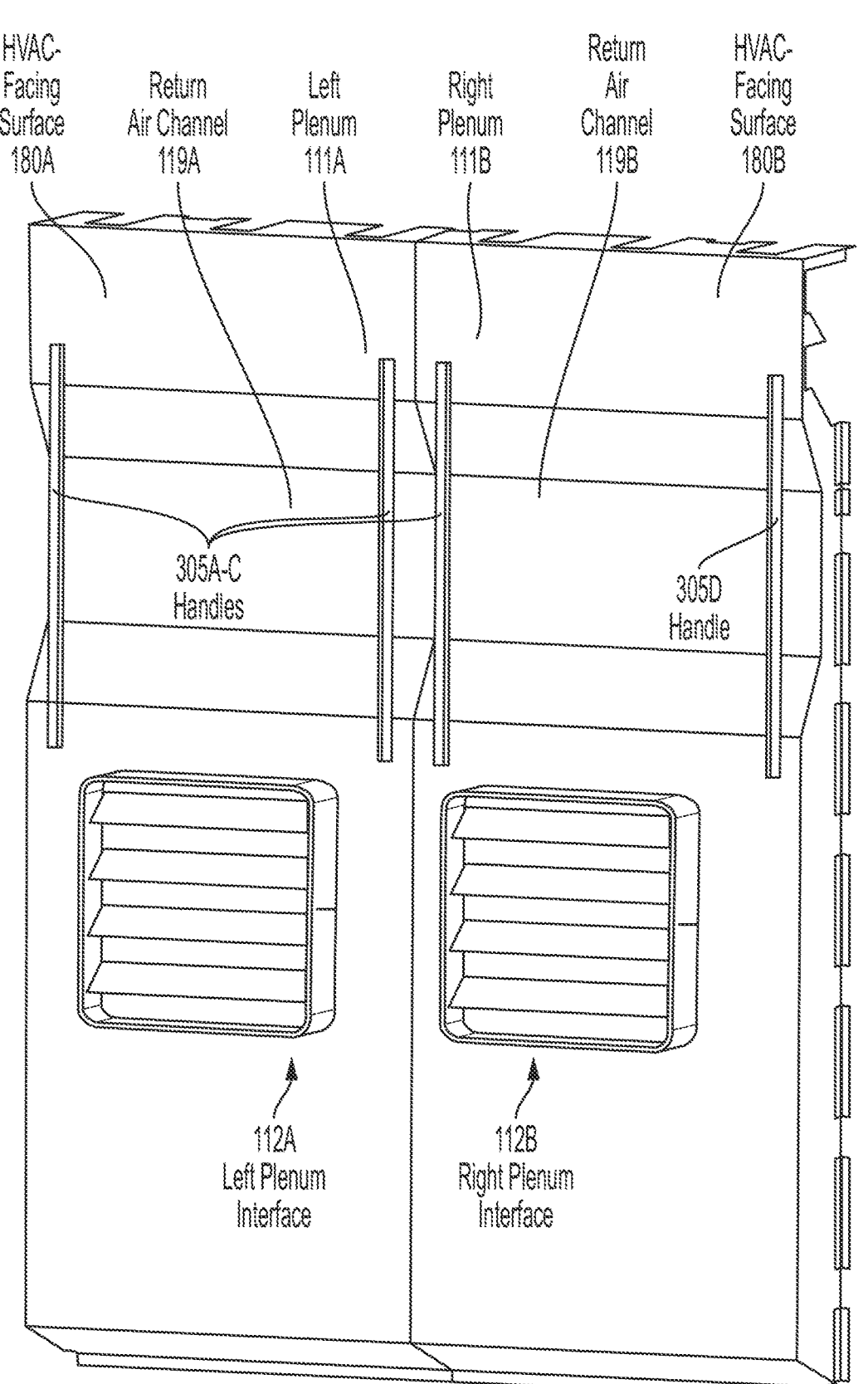
FIG. 3A is a front view of a plurality of plenums, for example a left plenum and a right plenum.
Figure 3B:
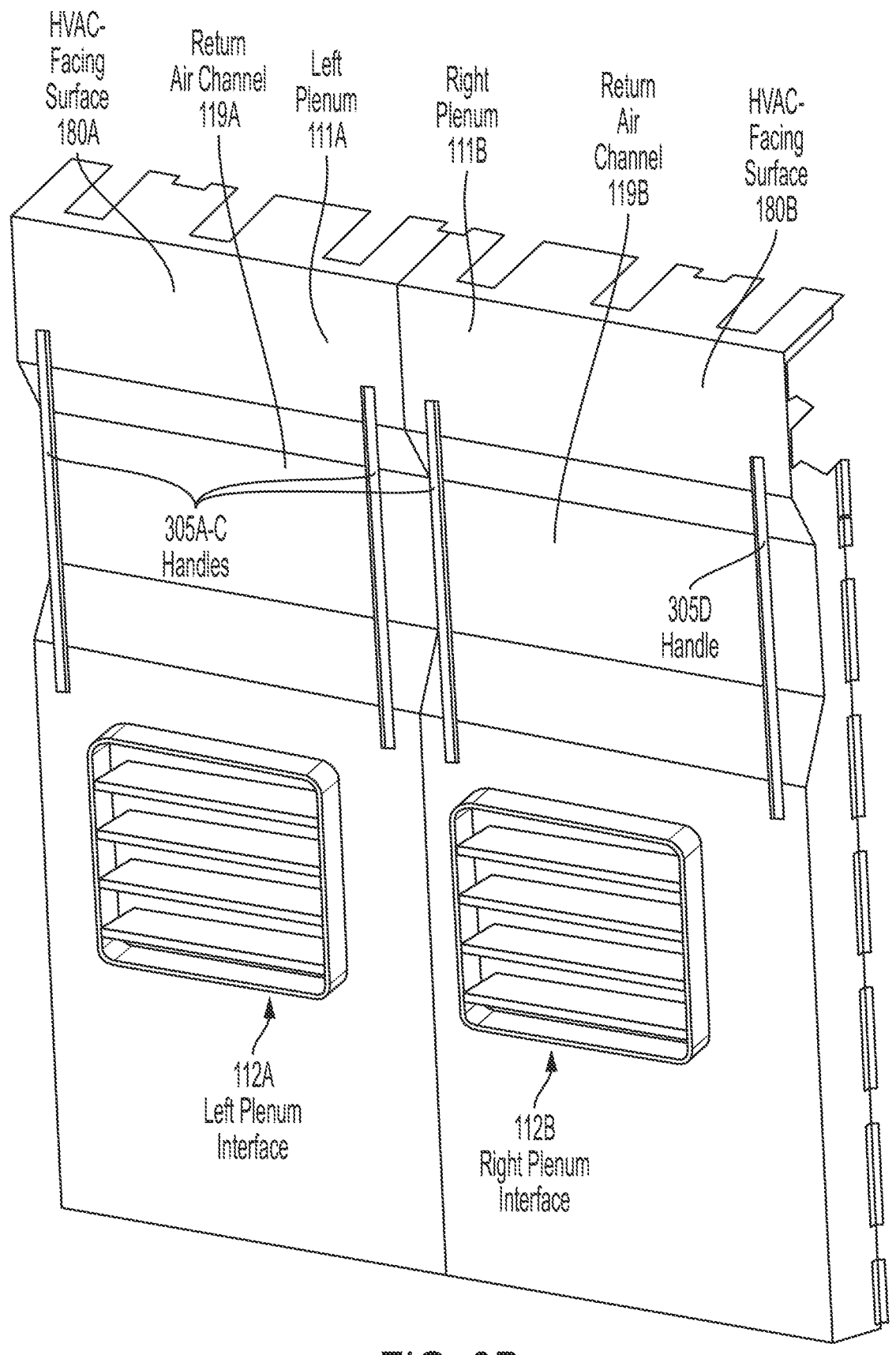
FIG. 3B is an isometric view of the left plenum and the right plenum.
Figure 3C:
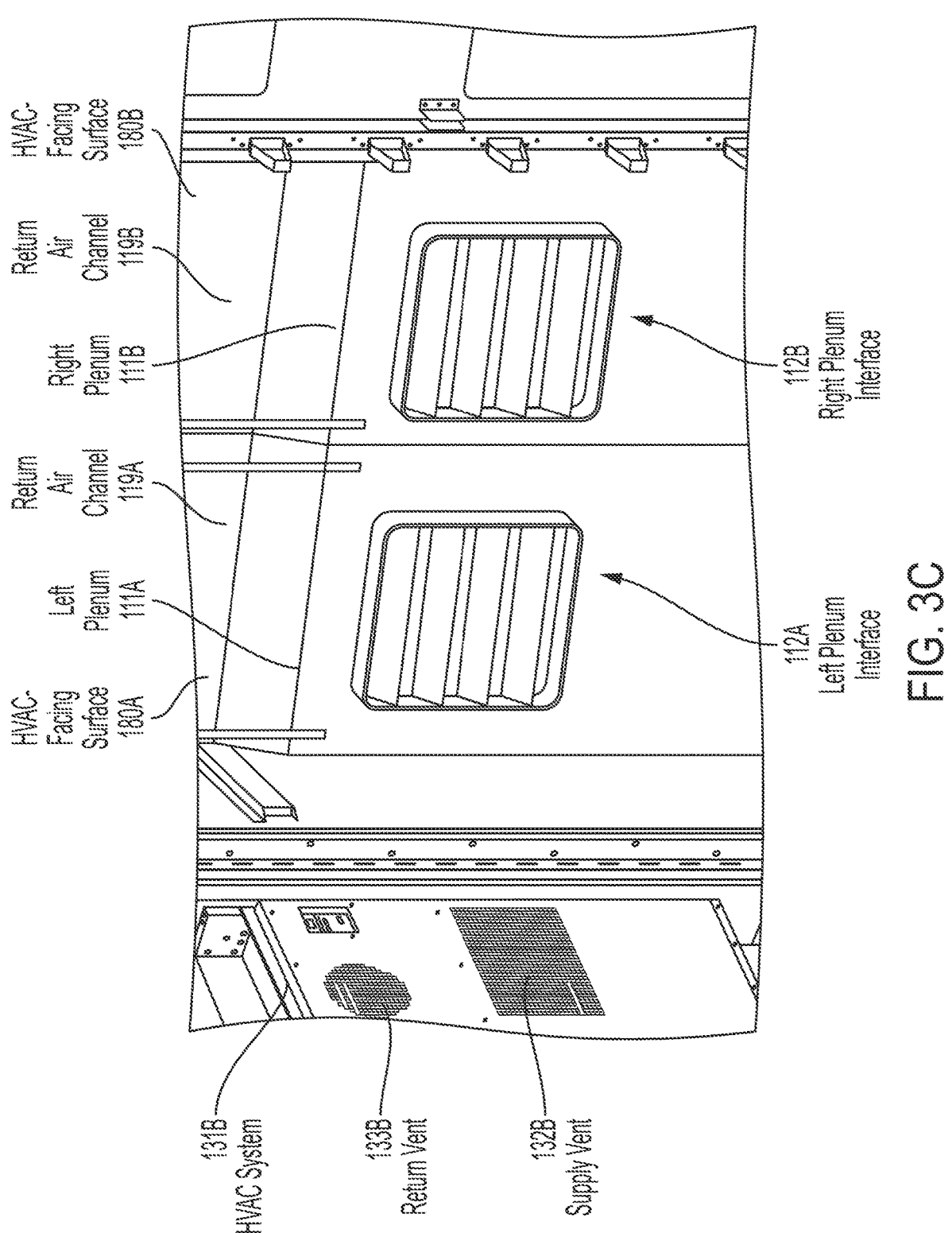
FIG. 3C is a zoomed in view of a left plenum interface and a right plenum interface.

FIG. 3A is a front view of a plurality of plenums 111A-B, for example a left plenum 111A and a right plenum 111B. FIG. 3B is an isometric view of the left plenum 111A and the right plenum 111B. FIG. 3C is a zoomed in view of the left plenum interface 112A and the right plenum interface 112B. The plurality of plenums 111A-B are coupled together to form an enclosed channel 140 around the plurality of battery racks 101A-C to direct air to the plurality of battery racks 101A-C. As shown, the left plenum 111B includes a plurality of handles 305A-B and the right plenum 111B includes a plurality of handles 305C-D. More specifically, each plenum 111A-B has two handles 305A-B, 305C-D, respectively, for ease of handling and installation. But the number of handles 305x of the left plenum 111A and the right plenum 111B can be fewer or greater than the two handles 305A-B, 305C-D shown. For example, the plenum 111x can include one, three, or four handles 305x.

The left plenum 111A and the right plenum 111B are incorporated into the energy system 100 of FIGS. 1A-D that includes a plurality of battery racks 101A-C holding a plurality of battery modules 102A. The energy storage system 100 further includes at least one heating, ventilation, and air conditioning (HVAC) system 131x to supply air to the plurality of plenums 111A-B. The at least one HVAC system 131x includes a supply vent 132x. The supply vent 132x outputs cold air for cooling (during air conditioning mode) of the respective battery modules 102A-N held by the battery racks 101A-C. Alternatively, the supply vent 132x outputs warm air for heating (during heating mode) of the battery modules 102A-N. The supply vent 132x is coupled a respective plenum 111A-B. For example, if there is a single HVAC system 131, then the single supply vent 132 is branched and coupled to both of the plenums 111A-B. Alternatively, if there are two HVAC systems 131A-B, then each supply vent 132A-B is separated and coupled to a respective plenum 111A-B.

In one example, the energy storage system 100 includes a plurality of heating, ventilation, and air conditioning (HVAC) systems 131A-B to supply air to a respective plenum 111A-B. Each HVAC system 131A-B includes a respective supply vent 132A-B and a respective return vent 133A-B. The respective plenum 111A-B includes a respective plenum interface 112A-B for coupling to the respective supply vent 132A-B or the respective return vent 133A-B of a respective HVAC system 131A-B. In a first example, the plenum interface 112A-B is coupled to the respective supply vent 132A-B of the respective HVAC system 131A-B. The respective plenum 111A-B includes a respective return air channel 119A-B coupled to the respective return vent 133A-B of the respective HVAC system 131A-B. As shown, the left plenum 111A includes a left return air channel 119A and the right plenum 111B includes a right return air channel 119B. Left plenum 111A includes an HVAC-facing surface 180A in which the left return air channel 119A is formed as two inwards sloped surfaces that intersect a flat surface. Right plenum 111B includes another HVAC-facing surface 180B in which the right return air channel 119B is similarly formed.

Existing plenum designs typically require that the cross-sectional area of a plenum meet or exceed the cross-sectional area of the HVAC supply/return in order to maintain the speed of airflow in an enclosure environment. In contrast, as shown in FIGS. 4A-D, the advantage of the proposed plenum 111x design, is that the plenum 111x can be open from one side (e.g., HVAC-facing surface 180x), and covered from five sides (top surface 160, inner side wall 414, outer side wall 415, and bottom surface 416), which allows the plenum 111x dimensions to be much smaller and for the airflow to be directed straight out to the battery racks 101A-C (e.g., heat source) via the enclosed channel 140 rather than going through several channels, which can result in a loss of air velocity. Moreover, the existing plenum designs require bolts, screws, or brackets to secure the existing plenums in place. In contrast, the design of plenum 111x enables easier installation and removal of the plenum 111x. During installation, the plenum 111x can be dropped in place by an installer (e.g., single person) using the built-in handles 305A-B and then coupled to the battery racks 101A-C via the side slots 408A-G and self-clinching studs 161x on the top surface 160. During removal, the plenum 111x can be lifted out of place by the installer using the built-in handles 305A-B. Finally, as described in FIGS. 6A-B, the plenum 111x design is adjustable to facilitate the depth adjustment 615A-B to the HVAC system 131x via the plenum interface 112x.

Figure 4A:
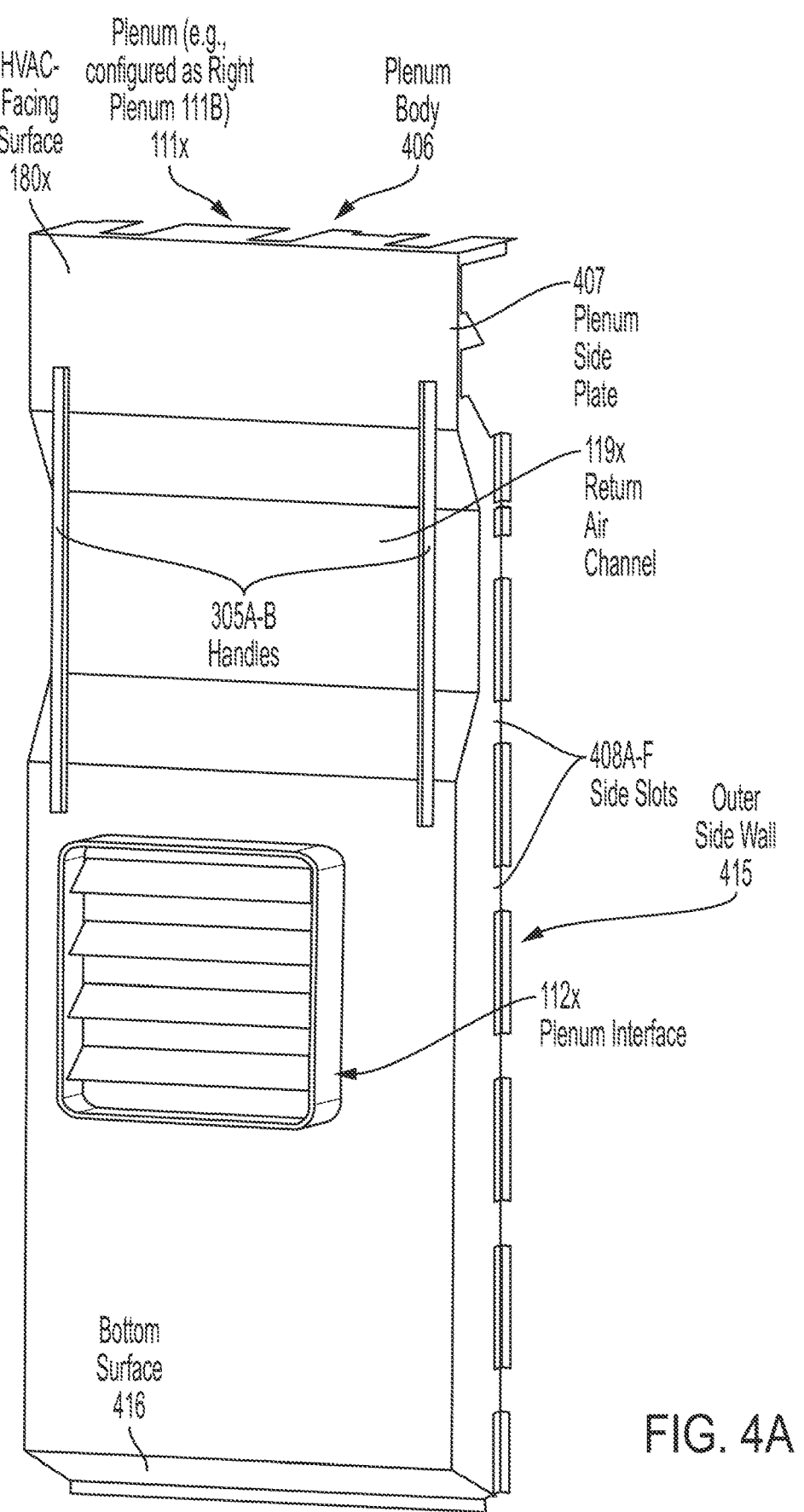
FIG. 4A is a front view of a single plenum, e.g., configured as a right plenum.
Figure 4B:
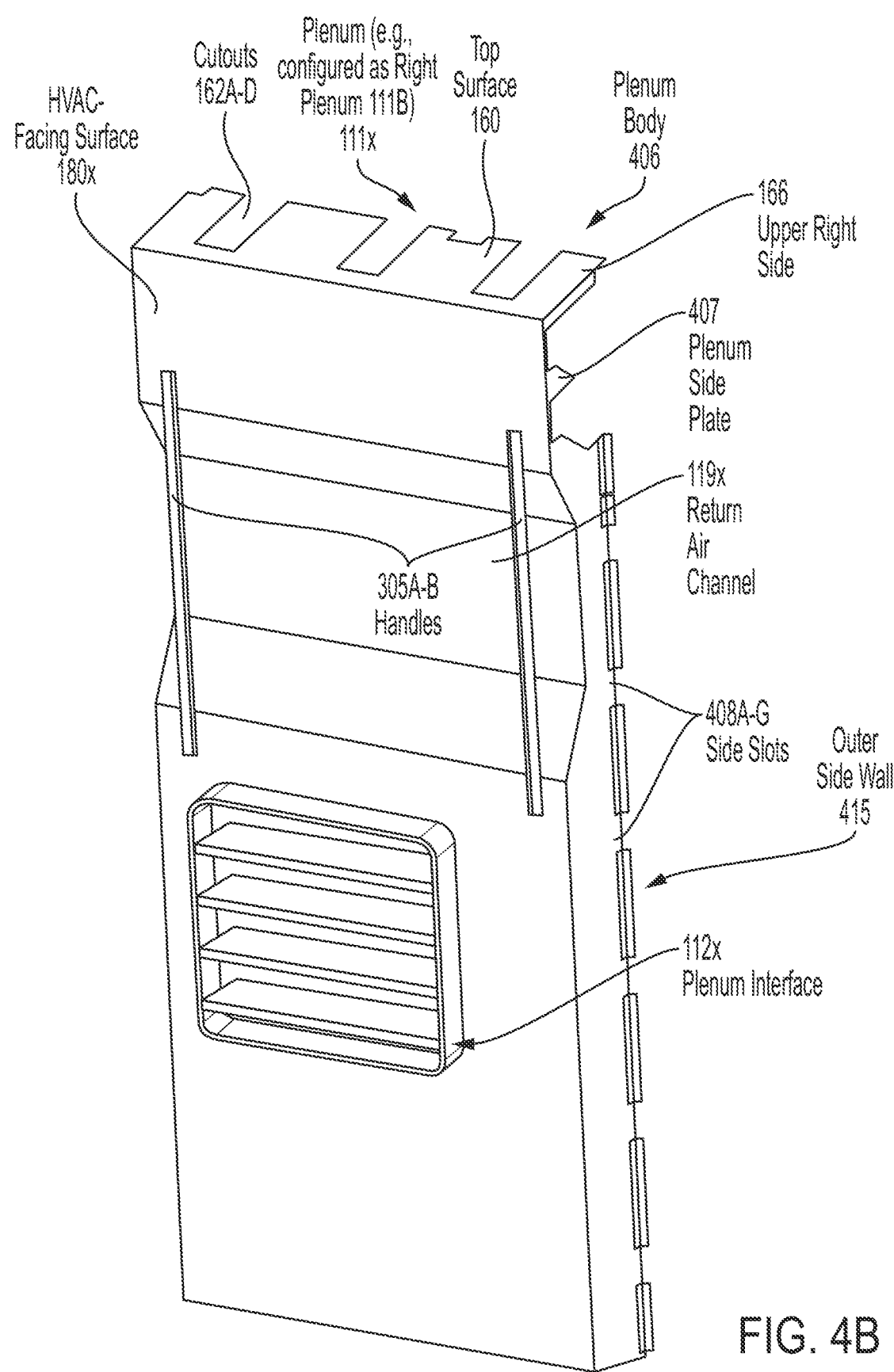
FIG. 4B is an isometric view of the plenum of FIG. 4A.

FIG. 4A is a front view of a single plenum 111x, e.g., configured as a right plenum 111B. FIG. 4B is an isometric view of the plenum 111x of FIG. 4A. As shown, the plenum 111x includes a plenum interface 112x for coupling to a supply vent 132x of the HVAC system 131x like that of FIGS. 3A-C. Plenum 111x also includes a return air channel 119x for coupling to the return vent 133x like that of FIGS. 3A-C. In the arrangement of FIGS. 4A-B, the plenum 111x causes a front to rear air flow through the battery racks 101A-C.

As shown, plenum 111x includes a plenum body 406, handles 305A-B, plenum side plate 407, inner side wall 414, outer side wall 415, and bottom surface 416. Plenum 111x can be assembled using stainless steel rivets, for example. The plenum 111x has side slots 408A-G on the sides (e.g., formed in outer side wall 415), and the side slots 408A-G act as guides for positioning of the plenum 111x on the battery racks 101A-C. As depicted in FIG. 2, the respective battery rack 101A-F includes a plurality of tabs 210A-G. The respective plenum 111A-B is coupled to the respective battery rack 101A-C via the plurality of tabs 210A-G. For example, respective side slots 408A-G engage respective tabs 210A-G on front-facing surfaces 215A-C of the battery racks 101A-C to secure plenum 111x in place. The side slots 408A-G of the plenum 111x and the respective tabs 210A-G on the battery racks 101A-C can be located on different surfaces to secure the plenum 111x in place.

FIG. 4B further depicts that the plenum 111x includes a top surface 160 and an upper right side 166 (e.g., plenum side plate 407) that include cutouts 162A-D like that shown in FIG. 1D. Energy storage system 100 includes a plurality of cables for electrical connection to the respective battery rack 101A-C. The respective plenum 111A-B includes a top surface 160 having cutouts 162A-D for routing of the plurality of cables to the plurality of battery racks 101A-C.

Figure 4C:
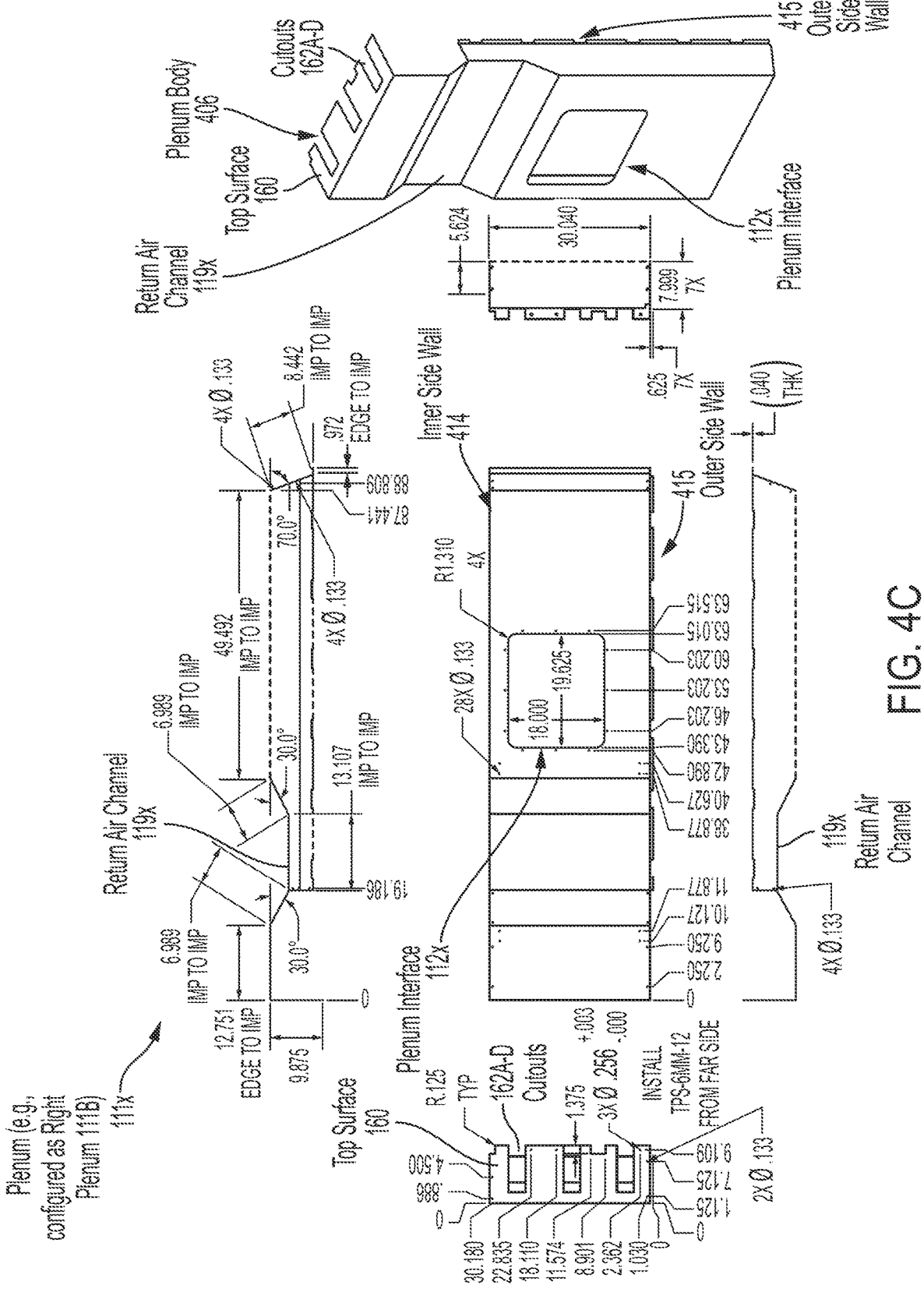
FIGS. 4C-D are views of a plenum showing the geometry, for example, dimensions in inches and degree measurements of the various structures of the plenum.
Figure 4D:
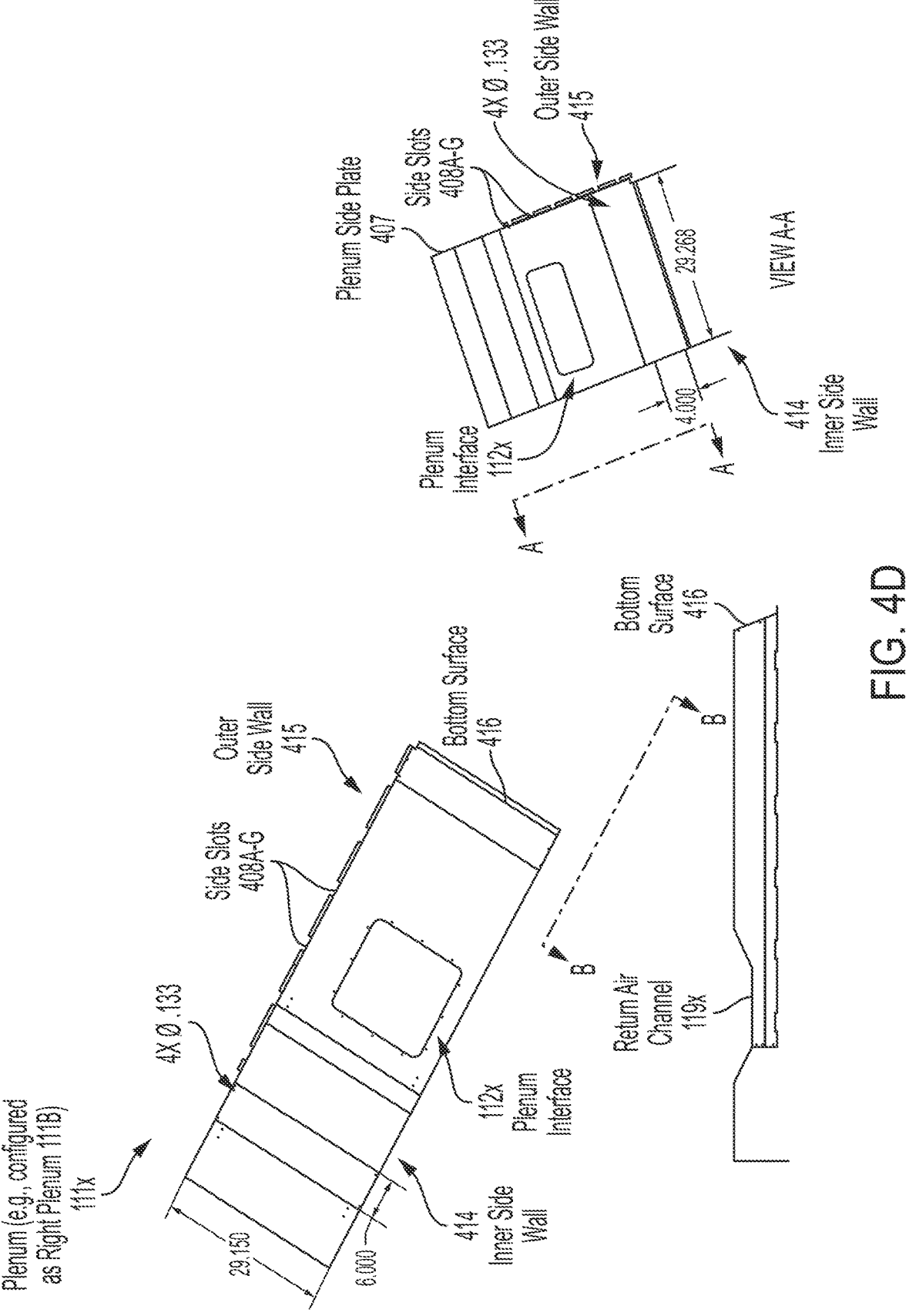

FIGS. 4C-D are views of a plenum 111x showing the geometry, for example, dimensions in inches and degree measurements of the various structures of the plenum 111x. As shown, the plenum 111x includes an inner side wall 414 and an outer side wall 415. For example, the outer side wall includes 415 includes the plenum side plate 407 and the side slots 408A-G. In the energy storage system 100, where the plurality of plenums 111A-B includes a left plenum 111A and a right plenum 111B, each plenum 111A-B includes a respective inner side wall 414A-B and a respective outer side wall 415A-B. The left plenum 111A and the right plenum 111B intersect at the respective inner side wall 414A-B. The respective outer side wall 415A-B covers a greater depth 193 of the respective battery rack 101A-C compared to the respective inner side wall 414A-B (e.g., inner side wall 414B is not as deep as outer side wall 415B).

Figure 5:
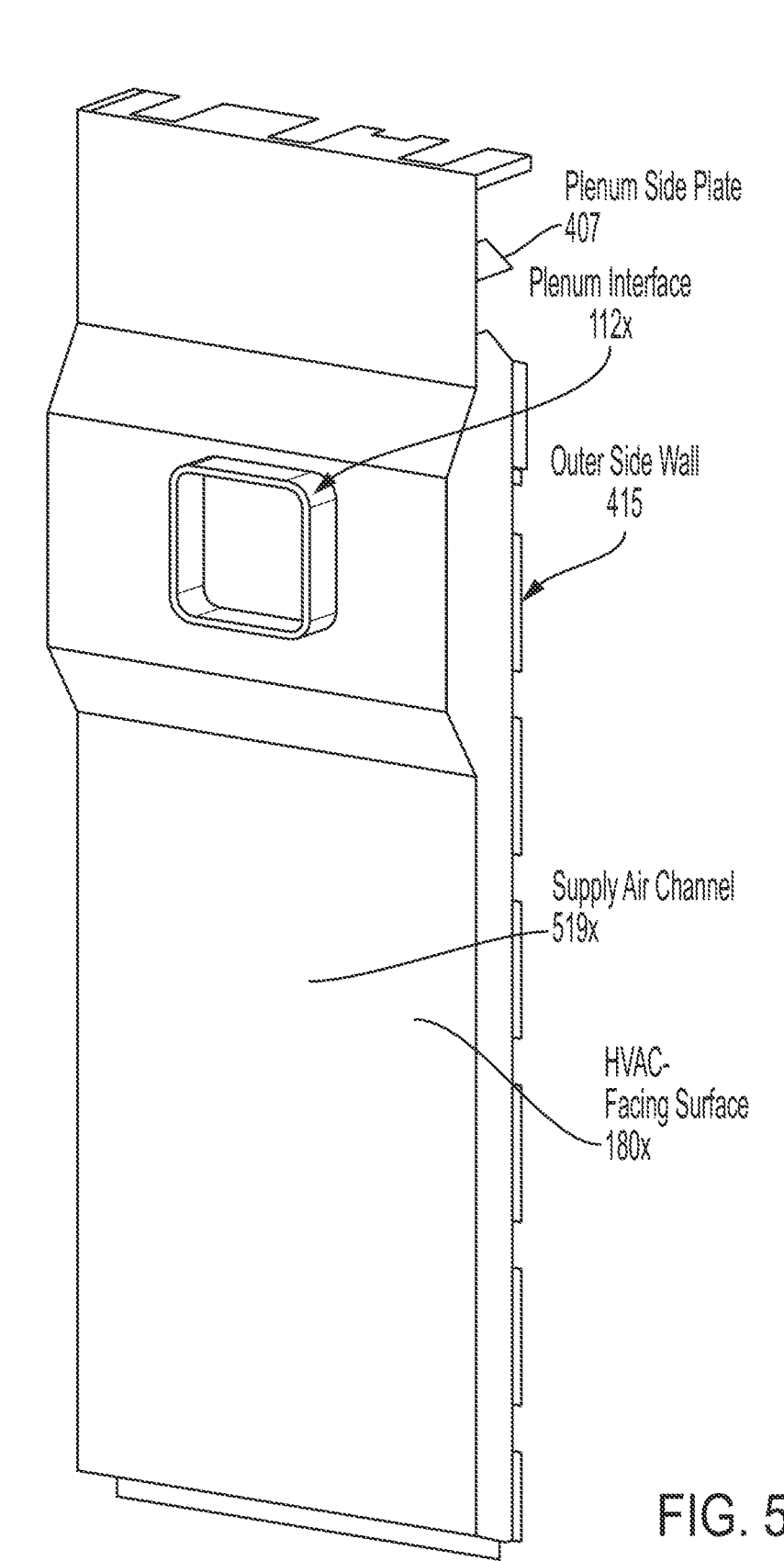
FIG. 5 is a front view of a single plenum, in which the single plenum includes a plenum interface coupled to a supply air channel of the HVAC system.

FIG. 5 is a front view of a single plenum 111x, in which the single plenum 111x includes a plenum interface 112x coupled to a supply air channel 532x of the HVAC system 131x. In other words, the plenum interface 112x is now relocated from the supply vent 132x to the return vent 133x, which causes a rear to front air flow through the battery racks 101A-C. The plenum 111x configured for the rear to front air flow configuration includes handles 305A-B, which are not depicted. Although shown as having a rectangular shape, the plenum interface 112x may be circular or any other shape that is suitable for coupling to the return vent 133x of the HVAC system 131x. Plenum 111x also now includes a supply air channel 519x, which is formed in the HVAC-facing surface 180x as a flat valley below the plenum interface 112x. For example, in an energy storage system 100 that includes a plurality of HVAC systems 131A-B, the respective plenum interface 112A-B is coupled to the respective return vent 133A-B of the respective HVAC system 131A-B. The respective plenum 111A-B includes a respective supply air channel 519A-B coupled to the respective supply vent 132A-B of the respective HVAC system 131A-B.

Either: (i) the supply vent 132x is coupled to the plenum interface 112x (as in FIGS. 4A-B), or (ii) the return vent 133x is coupled to the plenum interface 112x (as in FIG. 5), but not both (i) and (ii). Ducting both the supply vent 132x and the return vent 133x to separate plenum interfaces 112x would create a short-circuit inside the enclosed channel 140, which prevents proper air flow of the supply air and return air.

Figure 6A:
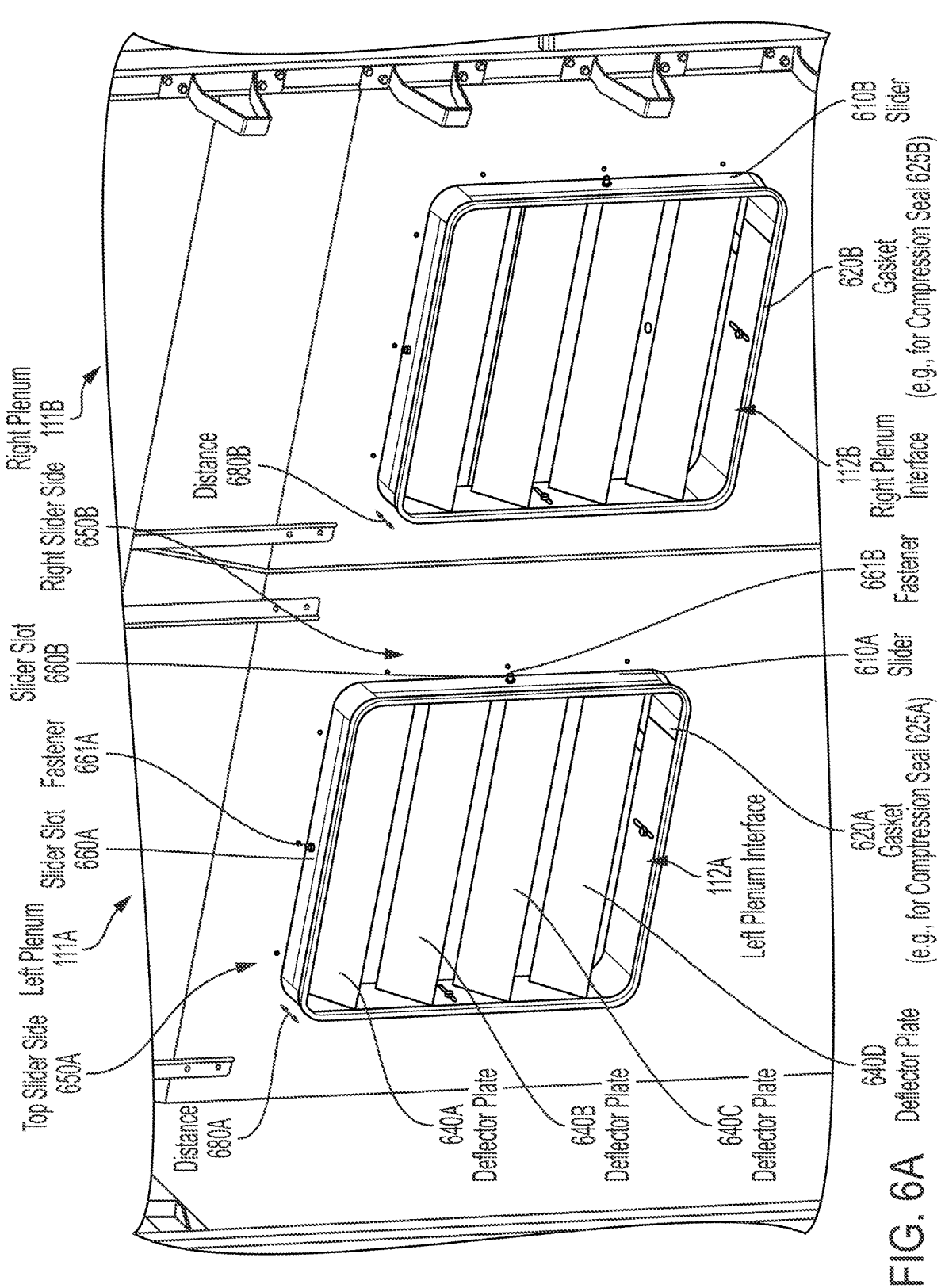
FIG. 6A is a zoomed in isometric view of the plenum interface of the left plenum and the plenum interface of the right plenum before a depth adjustment.
Figure 6B:
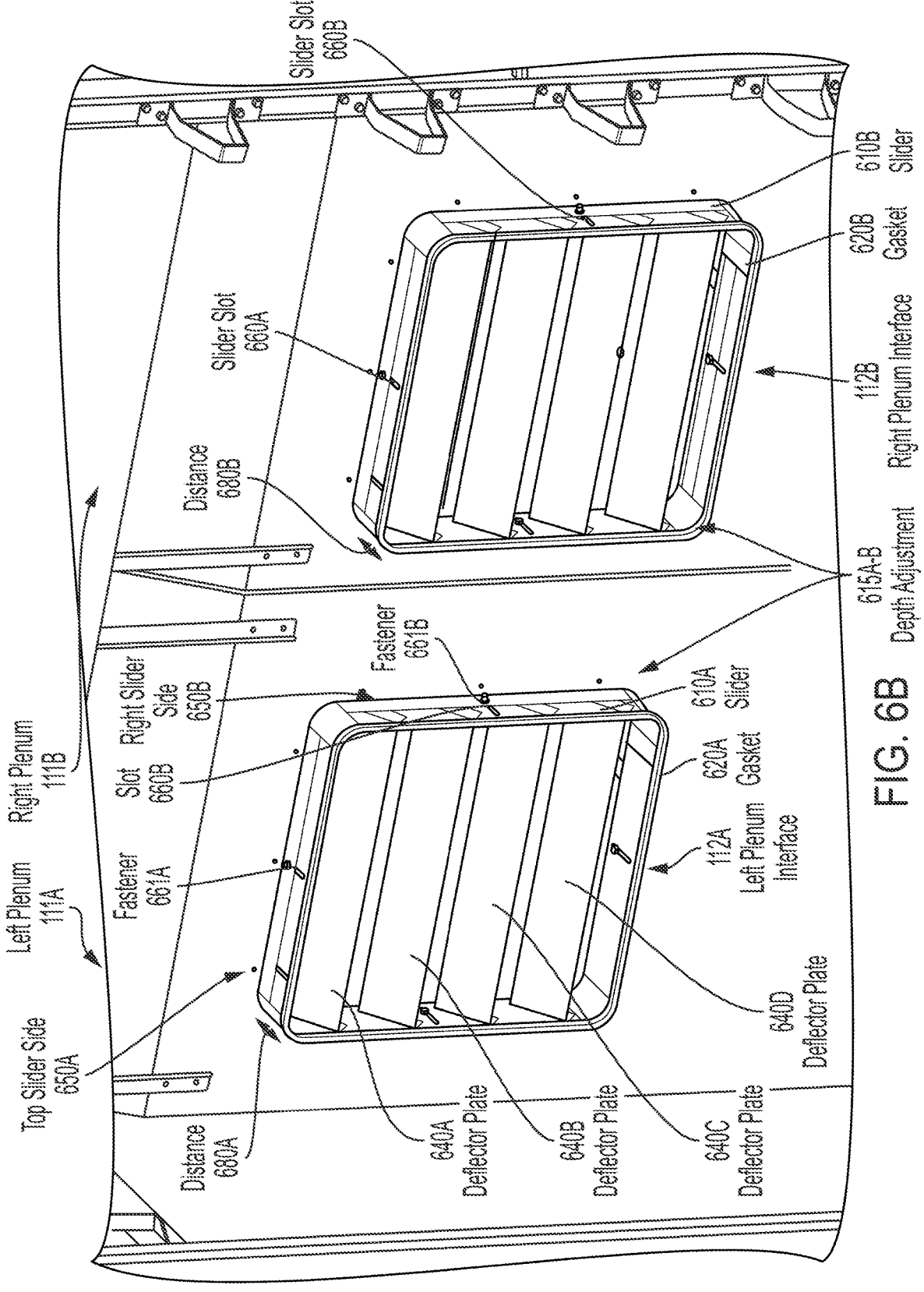
FIG. 6B is a zoomed in isometric view of the plenum interface of the left plenum and the plenum interface of the right plenum during the depth adjustment.
Figure 6C:
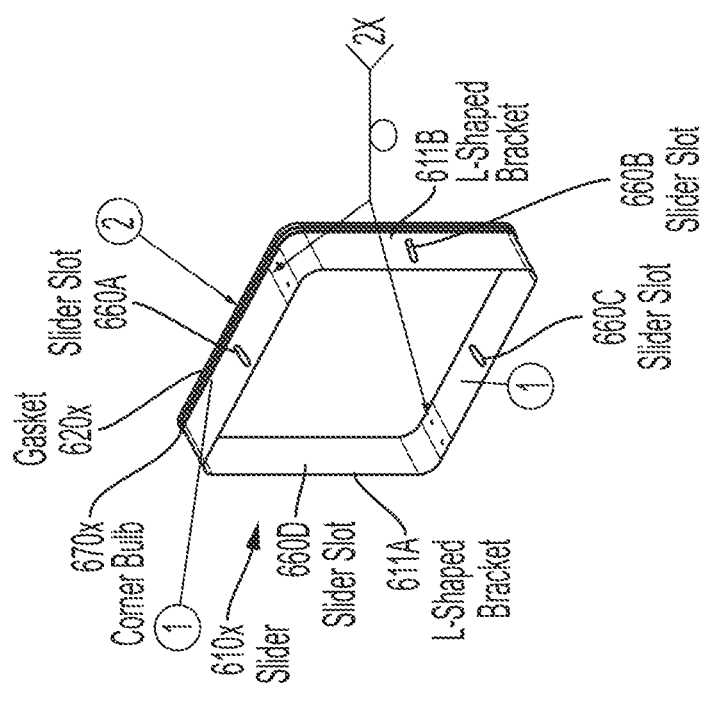
FIG. 6C are views of a plenum interface showing the geometry, for example, dimensions in inches and degree measurements of the various structures of the plenum interface.
Figure 6C:
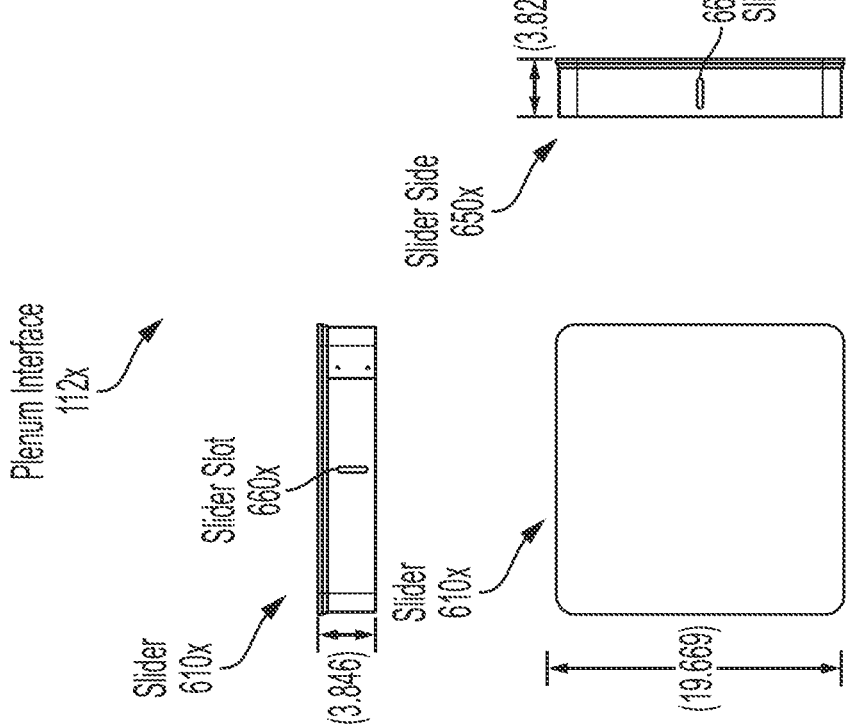

FIG. 6A is a zoomed in isometric view of the plenum interface 112A of the left plenum 111A and the plenum interface 112B of the right plenum 111B before a depth adjustment 615A-B. FIG. 6B is a zoomed in isometric view of the plenum interface 112A of the left plenum 111A and the plenum interface 112B of the right plenum 111B during the depth adjustment 615A-B. FIG. 6C are views of a plenum interface 112x showing the geometry, for example, dimensions in inches of the various structures of the plenum interface 112x. As shown, the respective plenum interface 112A-B includes a respective slider 610A-B for a depth adjustment 615A-B of the respective plenum 111A-B to the respective HVAC system 131A-B. The respective slider 610A-B can be formed of two sheet metal pieces (e.g., L-shaped brackets 611A-B) that are spot welded together, for example.

The respective plenum interface 112A-B includes a respective gasket 620A-B around the respective slider 610A-B to form a compression seal 625A-B between the respective slider 610A-B and the respective supply vent 132A-B or the respective return vent 133A-B. As shown, the respective gasket 620A-B sits on an outer portion of the respective slider 610A-B. The respective gasket 620A-B can be a push on seal that is water and weather resistant. The respective gasket 620A-B can be formed of fluoroelastomer, ethylene propylene diene rubber (EPDM), styrene butadiene rubber (SBR), or other thermoset or thermoplastic polymers. The respective gasket 620A-B can include corner bulbs 670x (e.g., two or four) formed of EPDM foam with a temperature range of –29° to 65° C. that compress between the two L-shaped brackets 611A-B that form the respective slider 610A-B. The respective gasket 620A-B compresses when the door 121 of the enclosure 120 is closed to provide a sealing mechanism between the respective plenum 111A-B and the respective HVAC system 131A-B.

In the example of FIGS. 6A-C, the respective plenum interface 112A-B is coupled to the respective supply vent 132A-B of the respective HVAC system 131A-B. The respective plenum interface 112A-B includes a plurality of deflector plates 640A-D to divert air flow to uniformly distribute air from the respective supply vent 132A-B to the plurality of battery racks 101A-C. More specifically, deflector plates 640A-D divert the air flow towards/across the battery racks 101A-C to achieve uniform distribution of air to the battery modules 101A-N, 102A-N, 103 A-N.

The respective plenum interface 112A-B includes four deflector plates 640A-D in FIGS. 6A-B. Each of the deflector plates 640A-D can be adjusted manually by an installer to optimize air flow distribution. The respective plenum interface 112A-B can include fewer or greater than four deflector plates 640A-D, for example, one, two, three, four, or five deflector plates 640x.

As further shown, the respective slider 610A-B includes a plurality of slider sides 650A-D (e.g. four), numbered consecutively in a clockwise direction as a top slider side 650A, a right slider side 650B, a bottom slider side 650C, and a left slider side 650D. Each slider side 650A-D of the respective slider 610A-B includes a respective slider slot 660A-D (e.g., four) for the depth adjustment 615A-B of the respective plenum 111A-B to the respective supply vent 132A-B or the respective return vent 133A-B. As shown, each of the four slider slots 660A-D have an oblong shape. Although shown as having an oblong shape, the slider slots 660A-D can be various shapes. The respective slider 610A-B further includes a respective fastener 661A-D (e.g., four class 8.8 steel flanged hex head screws are used) for the depth adjustment 615x of a slider side 650A-D. During the depth adjustment 615x, an installer utilizes a tool, such as screwdriver, to loosen the respective fastener 661A-D to free the respective slider side 650A-D and allow movement of the respective slider side 650A-D. When all fasteners 661A-D are sufficiently loosened, the installer pulls the respective slider 610A-B out of the respective plenum 111A-B or pushes the respective slider 610A-B into the respective plenum 111A-B to adjust a respective distance 680A-B of the respective slider 610A-B to the respective supply vent 132A-B or the respective return vent 133A-B. Once the respective distance is correctly set, the installer affixes the respective slider 610A-B to the respective supply vent 132A-B or the respective return vent 133A-B by tightening all fasteners 661A-D. The leeway of the respective distance 680A-B during the depth adjustment 615 can be several inches (e.g., 2-3 inches) or feet (1-3 feet) or more.

Sliders 610A-B can have a different shape, e.g., a continuous shape, such as a circle or oval; or the sliders 610A-B can be a discontinuous shape, such as a polyhedron, including a triangle, pentagon, etc. Hence, although the sliders 610A-B are shown as a rectangular shape that includes four sides 650A-D, the sliders 610A-B can include few or greater than four sides 650A-D. For example, the sliders 610A-B can have one side 650 with a continuous circumference or perimeter as in a circle or oval; or the sliders 610A-B can have two, three, five, or more sides 650x as in a polyhedron.

Figure 6D:
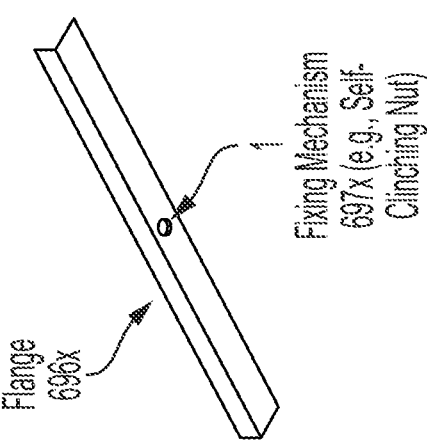
FIG. 6D depicts views of a flange assembly to couple the plenum interface to a supply vent or a return vent of the HVAC system.

FIG. 6D depicts views of a flange assembly 695x to couple the plenum interface 112x to a supply vent 132x or a return vent 133x. For each respective plenum 111A-B, the energy storage system 100 includes a respective flange assembly 695A-B that couples the respective plenum interface 112A-B to the respective supply vent 132A-B or the respective return vent 133A-B. Plenums 111A-B can integrate the flange assemblies 695A-B with the plenum interfaces 112A-B or the flange assemblies 695A-B can be provided separately and then coupled together.

The flange assembly 695x includes a plurality of flanges 696A-D (e.g., L-shaped sheet metal pieces). In the example, the flange assembly 695x includes four flanges 696A-D. The flange assembly 696x further includes a respective fixing mechanism 697A-D (e.g., an M6 self-clinching nut) to attach each of the flanges 696A-D around the slider 112x. The number of flanges 696x can vary depending on the shape (e.g., polygon shape) of the plenum interface 112x and the supply vent 132x or the return vent 133x. Alternatively, the flange assembly 695x can be a continuous circular or oval shape formed of a single piece of flange 696 with one or more fixing mechanisms 697x to attach a circumference or perimeter of the flange 696 to the supply event 132x or the return vent 133x.

In FIGS. 5 and 6A-D, an energy storage system 100 includes an enclosure 120 around the plurality of battery racks 101A-C and the plurality of plenums 111A-B. Enclosure 120 includes a door 121 and the plurality of HVAC systems 131A-B are mounted on the door 121. When the door 131 is closed, a respective gasket 620A-B around a respective slider 610A-B forms a respective compression seal 625A-B between the respective slider 610A-B and the respective supply vent 132A-B or the respective return vent 133A-B.

Figure 7:
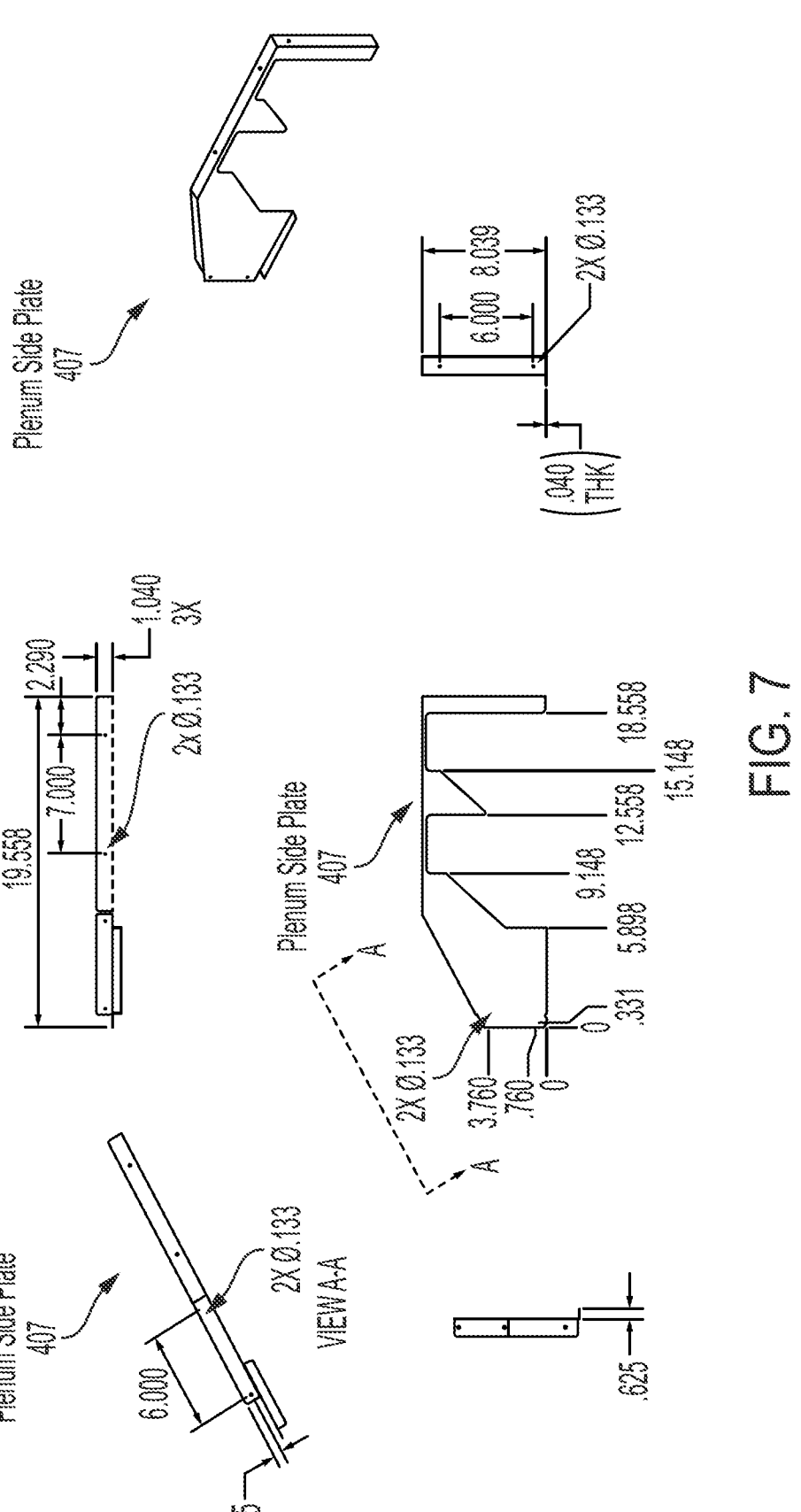
FIG. 7 depicts views of the plenum side plate showing the geometry, for example, dimensions in inches and degree measurements of the various structures of the plenum side plate.
Figure 8A:
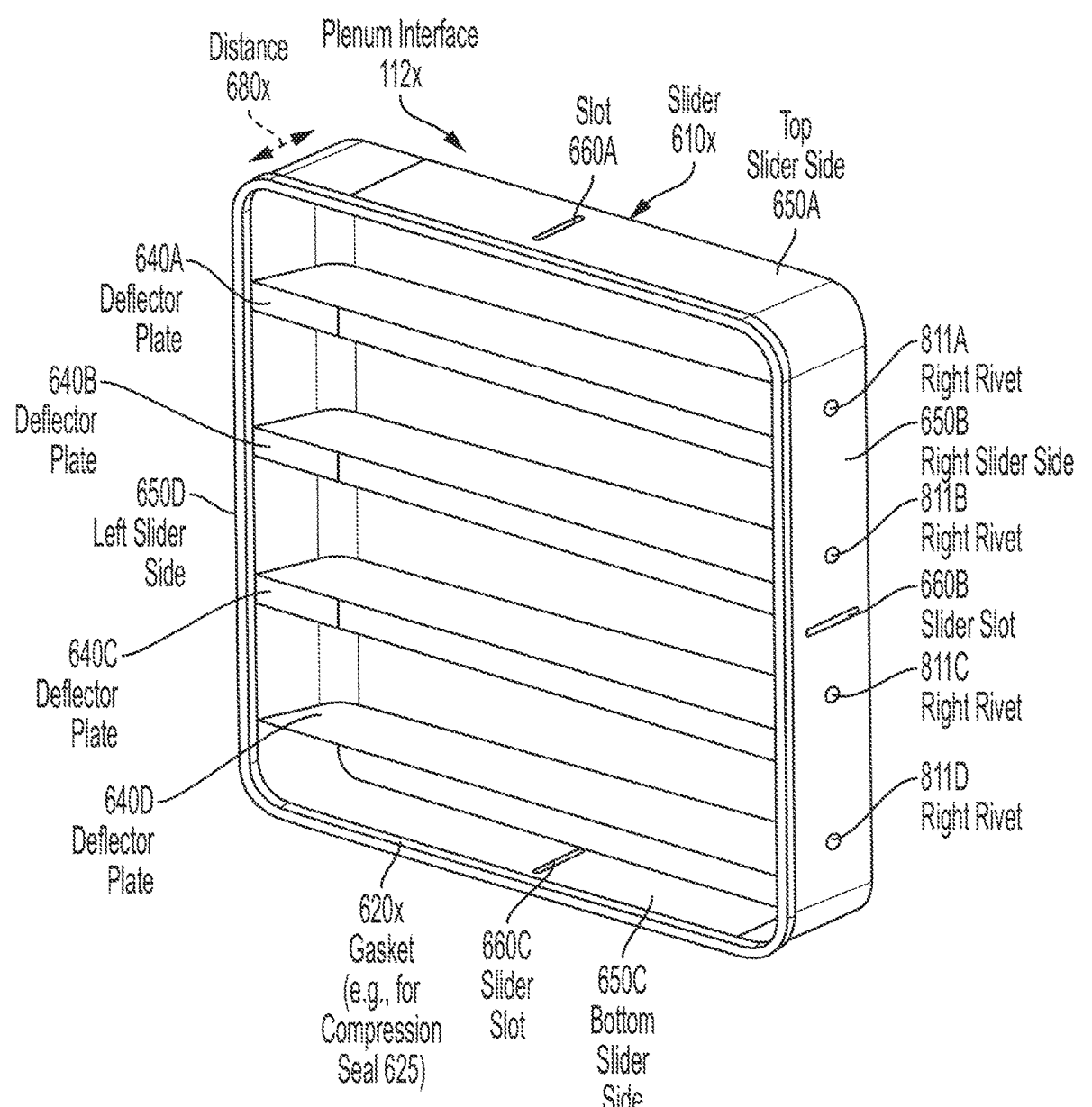
FIG. 8A is a zoomed in isometric view of a plenum interface showing a plurality of deflector plates (e.g., four) of the slider, as well as the gasket.

FIG. 7 depicts views of the plenum side plate 407 showing the geometry, for example, dimensions in inches of the various structures of the plenum side plate 407. The plenum side plate 407 is placed on the upper right side 166 of the plenum 111x to accommodate the protruding tray 183x. As noted earlier, the protruding tray 183x is mounted to the front of the battery rack 101x (see FIG. 1B for the protruding tray 183x). Cables that connect to the battery racks 101x are routed through the plenum side plate 407. For example, the cables can provide electrical connection for the battery modules 102x held in the battery racks 101x, as well as input/output (I/O) signals to the control processing logic for management of the battery racks FIG. 8A is a zoomed in isometric view of a plenum interface 112x showing a plurality of deflector plates 640A-D (e.g., four) of the slider 610x, as well as the gasket 610x. As shown, the slider 610x includes a plurality of slider sides 650A-D (e.g., four), which are labeled consecutively in a clockwise direction as top slider side 650A, a right slider side 650B, a bottom slider side 650C, and a left slider side 650D. Each slider side 650A-D includes a respective slider slot 660A-D. The plurality of deflector plates 640A-D are coupled to the right slider side 650B and the left slider side 650D. Each of the deflector plates 640A-D are coupled to the right slider side 650B by a respective right rivet 811A-D.

Although not visible in FIG. 8A, each of the deflector plates 640A-D are coupled to the left slider side 650B by a respective left rivet 806A-D.

Figure 8B:
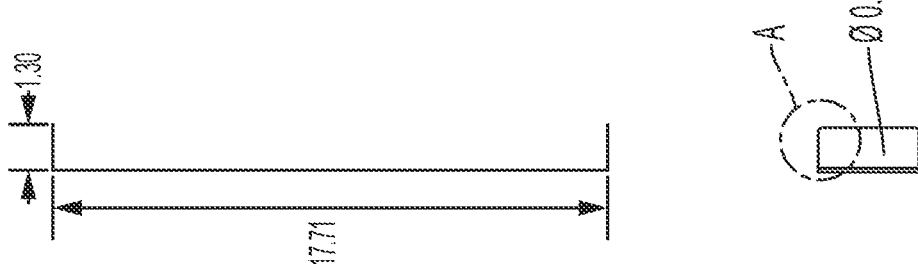
FIG. 8B depicts views of the deflector plate showing the geometry, for example, dimensions in inches and degree measurements of the various structures of the deflector plate.

FIG. 8B depicts views of the deflector plate 640x showing the geometry, for example, dimensions in inches of the various structures of the deflector plate 640x. The deflector plates 640A-D can be formed of 0.040 inch thick aluminum 5052-H32, for example.

Each deflector plate 640x is riveted on two opposing sides, for example, and can rotate along the axis of the rivet 806x, 811x. As shown, each deflector plate 640A-D is riveted on the left deflector side 805 and the right deflector side 810. The left deflector side 805 and the left slider side 650D both hold a respective left rivet 806A-D. The right deflector side 810 and the right slider side 650B both hold a respective right rivet 811A-D. Consequently, a respective deflector plate 640A-D can rotate along an axis of the respective left rivet 806A-D and the respective right rivet 811A-D. During installation, the installer rotates the deflector plates 640A-D to optimize air flow distribution to the battery modules 102x held in the battery racks 101x.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An energy storage system comprising:
an enclosure that includes at least one door, the enclosure enclosing:
a plurality of battery racks, each battery rack holding a respective plurality of battery modules; and
a plurality of plenums, wherein the plurality of plenums includes a left plenum and a right plenum coupled together to form an enclosed channel around the plurality of battery racks to direct air to the plurality of battery racks; and
a plurality of heating, ventilation, and air conditioning (HVAC) systems mounted on the at least one door to supply air to the left plenum and the right plenum, wherein each HVAC system includes a respective supply vent and a respective return vent;
wherein the left plenum and the right plenum each include a plenum interface for coupling to the respective supply vent or the respective return vent.

2. The energy storage system of claim 1, wherein:
the plurality of plenums include a first plenum set and a second plenum set;
the first plenum set includes a first left plenum and a first right plenum;
the second plenum set includes a second left plenum and a second right plenum;
the enclosure includes a first door and a second door;
the respective plurality of battery modules include a respective set of power modules;
the plurality of battery racks include:
a first set of battery racks facing the first door that hold a respective first set of power modules, and
a second set of battery racks facing the second door that hold a respective second set of power modules; and
the first left plenum and the first right plenum form a first enclosed channel around the first set of battery racks to direct air to the first set of battery racks; and
the second left plenum and the second right plenum form a second enclosed channel around the second set of battery racks to direct air to the second set of battery racks.

3. The energy storage system of claim 2, wherein:
the first door is a front door; and
the second door is a rear door.

4. An energy storage system comprising:
a plurality of battery racks;
a plurality of plenums, wherein the plurality of plenums are coupled together to form an enclosed channel around the plurality of battery racks to direct air to the plurality of battery racks,
wherein each plenum is configured to attach to the plurality of battery racks.

5. The energy storage system of claim 4, wherein:
the plurality of battery racks hold a plurality of battery modules; and the plurality of battery modules include energy modules, power modules, or a combination of the energy modules and the power modules.

6. The energy storage system of claim 4, further comprising:

at least one heating, ventilation, and air conditioning (HVAC) system to supply air to the plurality of plenums;

wherein:

the at least one HVAC system includes a supply vent;

the supply vent is coupled to a respective plenum; and the supply vent outputs cold air for cooling or warm air for heating.

7. The energy storage system of claim 6, further comprising:

a plurality of heating, ventilation, and air conditioning (HVAC) systems to supply air to a respective plenum, wherein each HVAC system includes a respective supply vent and a respective return vent;

wherein the respective plenum includes a respective plenum interface for coupling to the respective supply vent or the respective return vent of a respective HVAC system.

8. The energy storage system of claim 7, wherein:

the plenum interface is coupled to the respective supply vent of the respective HVAC system; and the respective plenum includes a respective return air channel coupled to the respective return vent of the respective HVAC system.

9. The energy storage system of claim 7, wherein:

the respective plenum interface is coupled to the respective return vent of the respective HVAC system; and the respective plenum includes a respective supply air channel based coupled to the respective supply vent of the respective HVAC system.

10. The energy storage system of claim 7, wherein:

the respective plenum interface includes:

a slider for a depth adjustment of the respective plenum to the respective HVAC system; and a gasket around the slider to form a compression seal between the slider and the respective supply vent or the respective return vent.

11. The energy storage system of claim 10, wherein:

the respective plenum interface is coupled to the respective supply vent of the respective HVAC system; and the respective plenum interface includes a plurality of deflector plates to divert air flow to uniformly distribute air from the respective supply vent to the plurality of battery racks.

12. The energy storage system of claim 10, wherein the slider includes at least two (2) L-shaped brackets.

13. The energy storage system of claim 10, wherein:

the slider includes a plurality of sides;

each side of the slider includes a slot for the depth adjustment of the respective plenum to the respective supply vent or the respective return vent.

14. The energy storage system of claim 10, further comprising:

an enclosure around the plurality of battery racks and the plurality of plenums;

wherein:

the enclosure includes a door, and the plurality of HVAC systems are mounted on the door.

15. The energy storage system of claim 14, wherein:

the gasket around the slider forms the compression seal between the slider and the respective supply vent or the respective return vent.

16. The energy storage system of claim 4, wherein:

a respective battery rack includes a plurality of battery modules;

the respective battery rack includes a plurality of tabs; and a respective plenum is configured to attach to the respective battery rack via the plurality of tabs.

17. The energy storage system of claim 16, further comprising:

a plurality of cables for electrical connection to the respective battery rack;

wherein the respective plenum includes a top surface having cutouts for routing of the plurality of cables to the plurality of battery racks.

18. The energy storage system of claim 16, wherein:

each plenum approximately covers an entire height of the respective battery rack and at least an entire width of the respective battery rack.

19. The energy storage system of claim 4, wherein the plurality of plenums includes a left plenum and a right plenum.

20. The energy storage system of claim 19, wherein:

each plenum includes a respective inner side wall and a respective outer side wall;

the left plenum and the right plenum intersect at the respective inner side wall; and the respective outer side wall covers a greater depth of the respective battery rack compared to the respective inner side wall.

21. The energy storage system of claim 1, wherein each plenum interface is configured to abut the respective supply vent or the respective return vent.

22. The energy storage system of claim 1, wherein the left plenum and the right plenum each include a plurality of handles.

23. The energy storage system of claim 4, wherein each plenum includes side slots for attaching to the plurality of battery racks.

* * * * *